(12) United States Patent
Dal Pra' et al.

(10) Patent No.: US 9,174,700 B2
(45) Date of Patent: Nov. 3, 2015

(54) CONTROL DEVICE FOR A BICYCLE DERAILLEUR

(75) Inventors: Giuseppe Dal Pra', Zane (IT); Marco Caiazzo, Torri di Quartesolo (IT)

(73) Assignee: Campagnolo S.r.l., Vicenza (IT)

( * ) Notice: Subject to any disclaimer, the term of this patent is extended or adjusted under 35 U.S.C. 154(b) by 1147 days.

(21) Appl. No.: 12/161,739

(22) PCT Filed: Jan. 23, 2006

(86) PCT No.: PCT/IT2006/000037
§ 371 (c)(1),
(2), (4) Date: Oct. 10, 2008

(87) PCT Pub. No.: WO2007/083331
PCT Pub. Date: Jul. 26, 2007

(65) Prior Publication Data
US 2009/0031846 A1    Feb. 5, 2009

(51) Int. Cl.
*B62L 3/02*    (2006.01)
*B62K 23/06*   (2006.01)
*B62M 25/04*   (2006.01)

(52) U.S. Cl.
CPC . *B62L 3/02* (2013.01); *B62K 23/06* (2013.01); *B62M 25/04* (2013.01); *Y10T 74/2042* (2015.01); *Y10T 74/20438* (2015.01)

(58) Field of Classification Search
CPC ....... B62K 23/02; B62K 23/06; B62M 25/00; B62M 25/02; B62M 25/04; F16C 1/10; F16C 1/12; B62L 3/02
USPC .................. 74/502.2, 500.5, 488, 489, 501.6, 74/473.14, 473.15, 473.13, 577 R
IPC .......................... F16C 1/10; B62M 25/00, 25/04
See application file for complete search history.

(56) References Cited

U.S. PATENT DOCUMENTS

| 1,706,542 A | 3/1929 | Pugh et al. |
| 2,384,728 A | 9/1945 | Crumble |

(Continued)

FOREIGN PATENT DOCUMENTS

| CH | 248133 | 4/1947 |
| CN | 1144761 | 3/1997 |

(Continued)

OTHER PUBLICATIONS

Chinese Office Action, Appl. No. CN 200610090826.7, dated Apr. 3, 2009.

(Continued)

*Primary Examiner* — Daniel Yabut
(74) *Attorney, Agent, or Firm* — Volpe and Koenig, P.C.

(57) ABSTRACT

A control device for a derailleur of a bicycle is described, comprising a support body, a cable-winding bush supported for rotation with respect to the support body, an indexer mechanism housed in the support body and suitable for controlling the angular position of the cable-winding bush, and a single manual actuation lever, the indexer mechanism comprising a toothed wheel integral in rotation with the cable-winding bush and having a first and a second plurality of slanting teeth, a first pawl integral with a driven arm of the lever and brought into thrusting engagement upon the first teeth while the lever is manually moved in a first direction beyond a predetermined rotation threshold, and a second pawl driven out of retention engagement with the second teeth by the driven arm of the lever while the lever is manually moved in the first direction up to the predetermined rotation threshold.

22 Claims, 14 Drawing Sheets

(56) References Cited

U.S. PATENT DOCUMENTS

| | | |
|---|---|---|
| 2,586,604 A | 2/1952 | Bennett |
| 2,770,980 A | 11/1956 | Millward |
| 2,854,857 A | 10/1958 | Gleasman et al. |
| 3,279,779 A | 10/1966 | Thomas et al. |
| 3,760,648 A | 9/1973 | Hoffman |
| 3,776,061 A | 12/1973 | Yoshigai |
| 3,915,029 A | 10/1975 | Shimada |
| 3,972,247 A | 8/1976 | Armstrong |
| 4,002,350 A | 1/1977 | Timbs |
| 4,075,871 A | 2/1978 | Burke |
| 4,100,820 A | 7/1978 | Evett |
| 4,319,673 A | 3/1982 | Kojima |
| 4,454,784 A | 6/1984 | Shimano |
| 4,459,871 A | 7/1984 | Shimano |
| 4,605,240 A | 8/1986 | Ciem et al. |
| 4,740,001 A | 4/1988 | Torleumke |
| D298,309 S | 11/1988 | Coue |
| 4,840,082 A | 6/1989 | Terashima et al. |
| 4,885,951 A | 12/1989 | Desenclos et al. |
| 4,930,368 A | 6/1990 | Nagano |
| 4,945,785 A | 8/1990 | Romano |
| 4,966,046 A | 10/1990 | Tagawa |
| 5,012,692 A | 5/1991 | Nagano |
| 5,020,387 A | 6/1991 | Nagano |
| 5,050,444 A | 9/1991 | Nishimura |
| 5,094,120 A | 3/1992 | Tagawa |
| RE34,007 E | 7/1992 | Desenclos et al. |
| 5,159,851 A | 11/1992 | Rahmes |
| 5,186,071 A | 2/1993 | Iwasaki |
| 5,203,213 A | 4/1993 | Nagano |
| 5,213,005 A | 5/1993 | Nagano |
| 5,222,412 A | 6/1993 | Nagano |
| 5,241,878 A | 9/1993 | Nagano |
| 5,257,683 A | 11/1993 | Romano |
| 5,279,179 A | 1/1994 | Yoshigai |
| 5,287,765 A | 2/1994 | Scura |
| 5,303,608 A | 4/1994 | Iwasaki |
| 5,400,675 A | 3/1995 | Nagano |
| 5,479,776 A | 1/1996 | Romano |
| 5,480,356 A | 1/1996 | Campagnolo |
| 5,515,743 A | 5/1996 | Lumpkin |
| 5,528,954 A | 6/1996 | Yoshigai |
| 5,601,001 A | 2/1997 | Kawakami et al. |
| 5,676,020 A | 10/1997 | Jordan et al. |
| 5,676,021 A | 10/1997 | Campagnolo |
| 5,676,022 A * | 10/1997 | Ose .............................. 74/502.2 |
| 5,755,139 A | 5/1998 | Kojima |
| 5,787,757 A | 8/1998 | Ozaki |
| 5,791,195 A | 8/1998 | Campagnolo |
| 5,806,372 A | 9/1998 | Campagnolo |
| 5,832,782 A | 11/1998 | Kawakami |
| 5,896,779 A | 4/1999 | Biersteker et al. |
| 5,900,705 A | 5/1999 | Kimura |
| 5,921,140 A | 7/1999 | Lemmens et al. |
| 5,970,816 A | 10/1999 | Savard |
| 6,073,730 A | 6/2000 | Abe |
| 6,095,010 A | 8/2000 | Arbeiter |
| 6,098,488 A | 8/2000 | Vos |
| 6,370,981 B2 | 4/2002 | Watarai |
| 6,457,377 B1 | 10/2002 | Hsu |
| 6,502,477 B1 | 1/2003 | Assel |
| 6,553,861 B2 | 4/2003 | Ose |
| 6,564,670 B2 | 5/2003 | Feng et al. |
| 6,564,671 B2 | 5/2003 | Ose |
| 6,647,823 B2 | 11/2003 | Tsumiyama et al. |
| 6,792,826 B2 | 9/2004 | Dal Pra' |
| 7,100,471 B2 | 9/2006 | Irie et al. |
| 2002/0078789 A1 | 6/2002 | Chen |
| 2002/0104401 A1 | 8/2002 | Dal Pra' |
| 2002/0124679 A1 | 9/2002 | Dal Pra' |
| 2002/0139637 A1 | 10/2002 | Tsumiyama et al. |
| 2003/0094064 A1 | 5/2003 | Dal Pra' |
| 2003/0167871 A1 | 9/2003 | Irie et al. |
| 2003/0177855 A1 | 9/2003 | Tsumiyama et al. |
| 2004/0144193 A1 | 7/2004 | Sato et al. |
| 2004/0237697 A1 | 12/2004 | Kawakami |
| 2004/0237698 A1 | 12/2004 | Hilsky et al. |
| 2005/0241428 A1 | 11/2005 | Tsai |
| 2006/0070480 A1 | 4/2006 | Fujii |
| 2006/0207375 A1 | 9/2006 | Jordan et al. |
| 2006/0272443 A1 | 12/2006 | Tsumiyama |
| 2007/0034037 A1 | 2/2007 | Dal Pra' et al. |
| 2007/0068332 A1 | 3/2007 | Fujii et al. |
| 2007/0137388 A1 | 6/2007 | Dal Pra' |
| 2007/0137391 A1 | 6/2007 | Fujii |
| 2007/0178715 A1 | 8/2007 | Fujii |
| 2007/0186715 A1 | 8/2007 | Dal Pra' |
| 2007/0193386 A1 | 8/2007 | Fujii |
| 2007/0204716 A1 | 9/2007 | Dal Pra' |
| 2008/0098848 A1 | 5/2008 | Dal Pra' et al. |
| 2008/0196537 A1 | 8/2008 | Dal Pra' |
| 2008/0210041 A1 | 9/2008 | Dal Pra' et al. |
| 2008/0210042 A1 | 9/2008 | Dal Pra' |
| 2009/0025504 A1 | 1/2009 | Dal Pra' et al. |
| 2009/0031846 A1 | 2/2009 | Dal Pra' et al. |
| 2009/0133526 A1 | 5/2009 | Dal Pra' et al. |

FOREIGN PATENT DOCUMENTS

| | | |
|---|---|---|
| CN | 1144761 A | 3/1997 |
| CN | 2436412 | 6/2001 |
| CN | 1443679 | 9/2003 |
| CN | 1550405 | 12/2004 |
| DE | 3136922 | 3/1983 |
| DE | 3136922 A1 | 3/1983 |
| DE | 3706545 | 9/1988 |
| DE | 19607640 | 1/1997 |
| DE | 202006006796 | 8/2006 |
| EP | 0371254 | 6/1990 |
| EP | 0478901 | 4/1992 |
| EP | 0504118 | 9/1992 |
| EP | 0504118 A1 | 9/1992 |
| EP | 0361335 | 2/1994 |
| EP | 0601211 | 6/1994 |
| EP | 0601221 | 6/1994 |
| EP | 0601221 A1 | 6/1994 |
| EP | 0635422 | 1/1995 |
| EP | 0714826 | 6/1996 |
| EP | 0744334 | 11/1996 |
| EP | 0744334 A2 | 11/1996 |
| EP | 0790175 | 8/1997 |
| EP | 1123861 | 8/2001 |
| EP | 1134158 | 9/2001 |
| EP | 1245483 | 10/2002 |
| EP | 0785128 | 11/2002 |
| EP | 1264765 | 12/2002 |
| EP | 1342655 | 9/2003 |
| EP | 1440878 | 7/2004 |
| EP | 1440878 A2 | 7/2004 |
| EP | 1449756 | 8/2004 |
| EP | 1473220 | 11/2004 |
| EP | 1481883 | 12/2004 |
| EP | 1502847 | 2/2005 |
| EP | 1502847 A1 | 2/2005 |
| EP | 1535829 | 6/2005 |
| EP | 1564131 | 8/2005 |
| EP | 1642823 | 4/2006 |
| EP | 1698550 | 9/2006 |
| EP | 1739001 | 1/2007 |
| EP | 1816066 | 8/2007 |
| EP | 1826111 | 8/2007 |
| EP | 1698550 B1 | 4/2008 |
| FR | 960276 | 4/1950 |
| FR | 2777528 | 10/1999 |
| FR | 2861686 | 2/2006 |
| GB | 615173 | 1/1949 |
| GB | 2012893 | 8/1979 |
| JP | 58003987 | 6/1956 |
| JP | 51060342 | 5/1976 |
| JP | 17893 | 1/1982 |
| JP | 17894 | 1/1982 |
| JP | 58030884 A | 2/1983 |
| JP | 224879 | 12/1983 |
| JP | 60107475 | 6/1985 |

(56) References Cited

FOREIGN PATENT DOCUMENTS

| | | |
|---|---|---|
| JP | 157092 | 10/1989 |
| JP | 2088384 | 3/1990 |
| JP | 03292280 | 12/1991 |
| JP | 04331689 | 11/1992 |
| JP | 05097088 A | 4/1993 |
| JP | 05082786 | 11/1993 |
| JP | 05286476 | 11/1993 |
| JP | 06016170 | 1/1994 |
| JP | 07033063 A | 2/1995 |
| JP | 07251784 | 10/1995 |
| JP | 08328679 A | 12/1996 |
| JP | 61241287 | 10/2007 |
| TW | 136125 Y | 6/1990 |
| TW | 510875 | 11/2002 |
| TW | 519089 | 1/2003 |
| TW | 570013 Y | 1/2004 |
| TW | 1223636 | 11/2004 |
| WO | 9218374 | 10/1992 |
| WO | 03093094 | 11/2003 |
| WO | 2005044656 | 5/2005 |

OTHER PUBLICATIONS

Chinese Office Action, Appl. No. CN 200710005823.3, dated Sep. 25, 2009.
Chinese Office Action, Appl. No. CN 200810082341.2, dated Nov. 30, 2010.
European Search Report, Appl. No. EP 05425458.6, dated Nov. 16, 2005.
European Search Report, Appl. No. EP 05017003.4, dated Dec. 20, 2005.
European Search Report, Appl. No. 06003694.4, dated Jul. 31, 2006.
European Search Report, Appl. No. RS 144832, dated Apr. 16, 2007.
European Search Report, Appl. No. RS 115409, dated Jul. 18, 2007.
European Search Report, Appl. No. RS 115410, dated Jul. 31, 2007.
European Search Report, Appl. No. RS115682, dated Oct. 30, 2007.
European Search Report, Appl. No. 08003760.9, dated Jun. 27, 2008.
European Search Report, Appl. No. EP 08003755.9, dated Jun. 27, 2008.
European Search Report, Appl. No. EP 08022485.0, dated Jul. 2, 2009.
European Search Report, Appl. No. 08005438.0, dated Nov. 5, 2010.
Japanese Office Action, Appl. No. JP 2002-332045, dated Dec. 16, 2008.
Japanese Office Action, Appl. No. JP 2008-550914, dated May 24, 2011.
Japanese Office Action, Appl. No. 2006-176333, dated Aug. 23, 2011.
Taiwan Search Report, Appl. No. 096101651, dated Oct. 5, 2011.
Taiwan Office Action and Search Report, Appl. No. 095121477, dated Nov. 25, 2011.
Chinese Office Action, Appl. No. CN 200710005823.3, dated Sep. 5, 2009.

\* cited by examiner

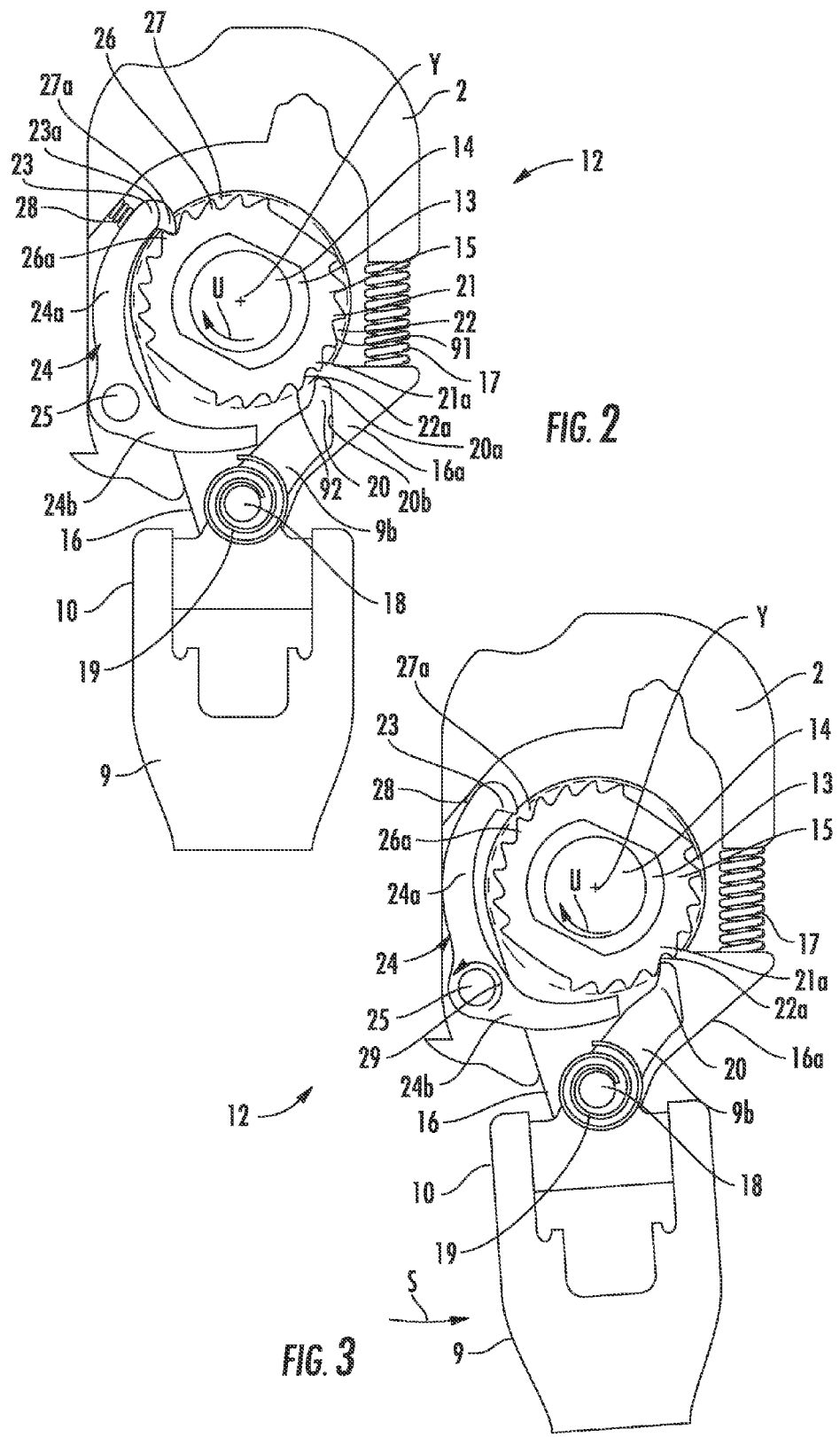

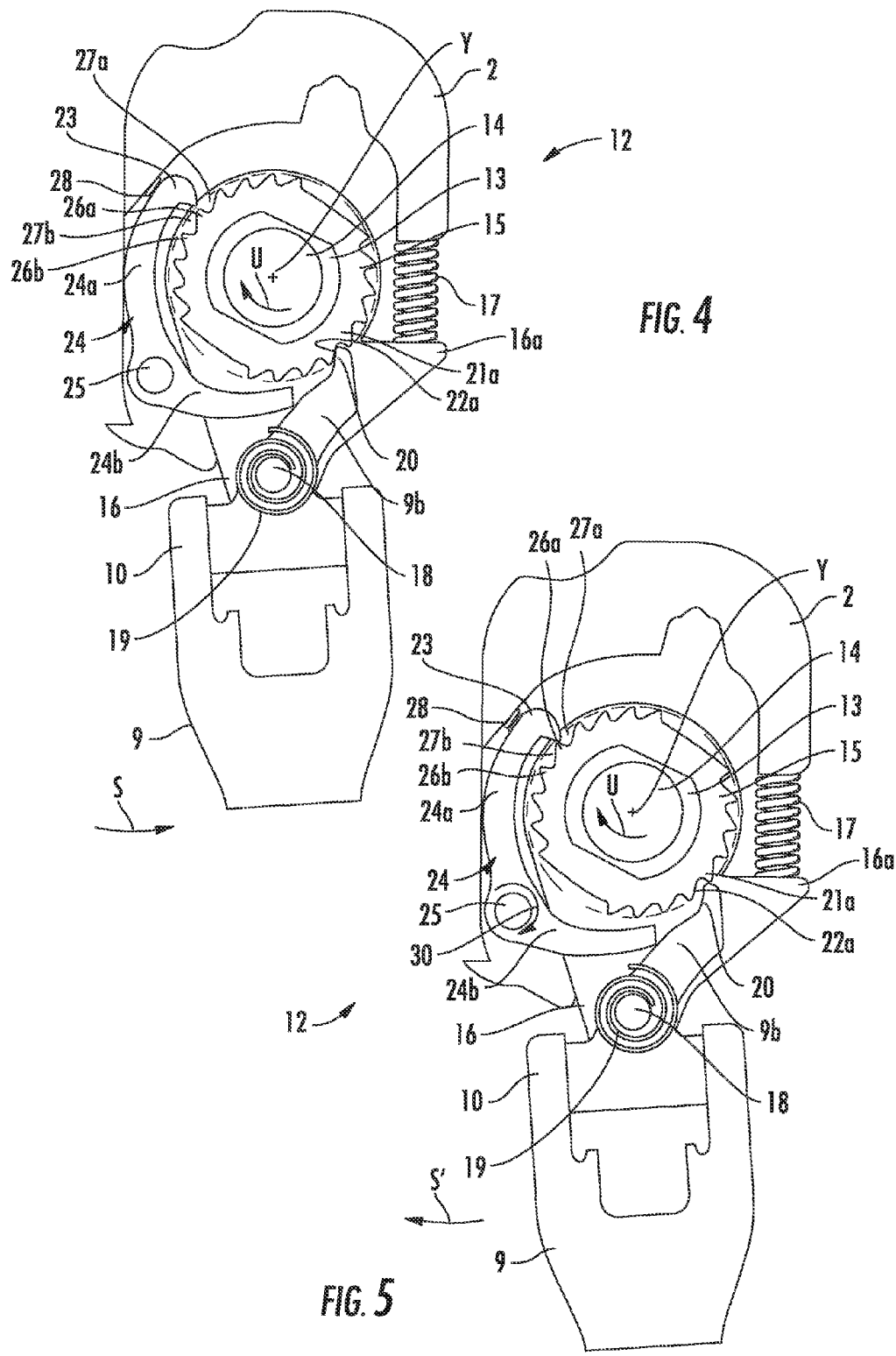

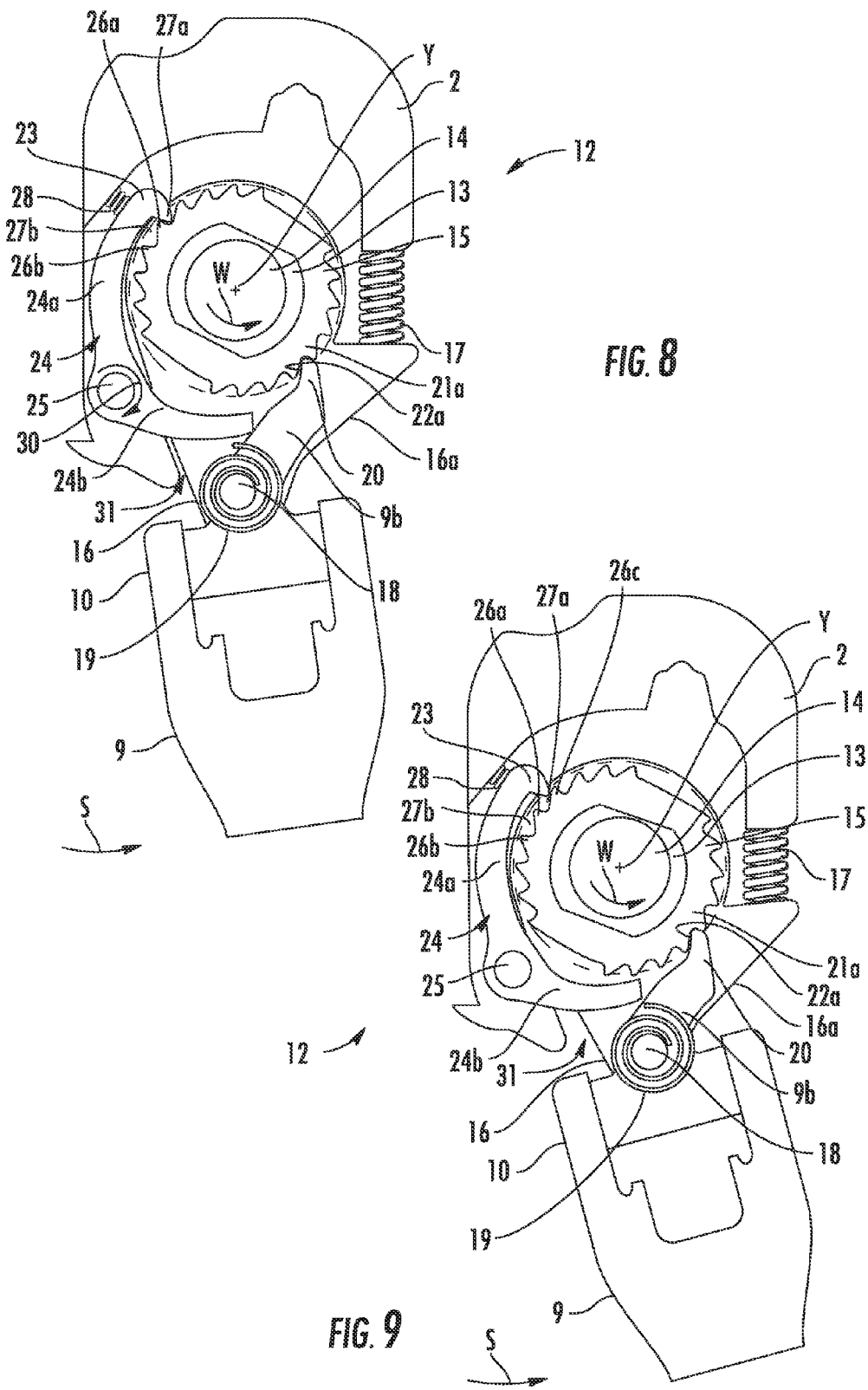

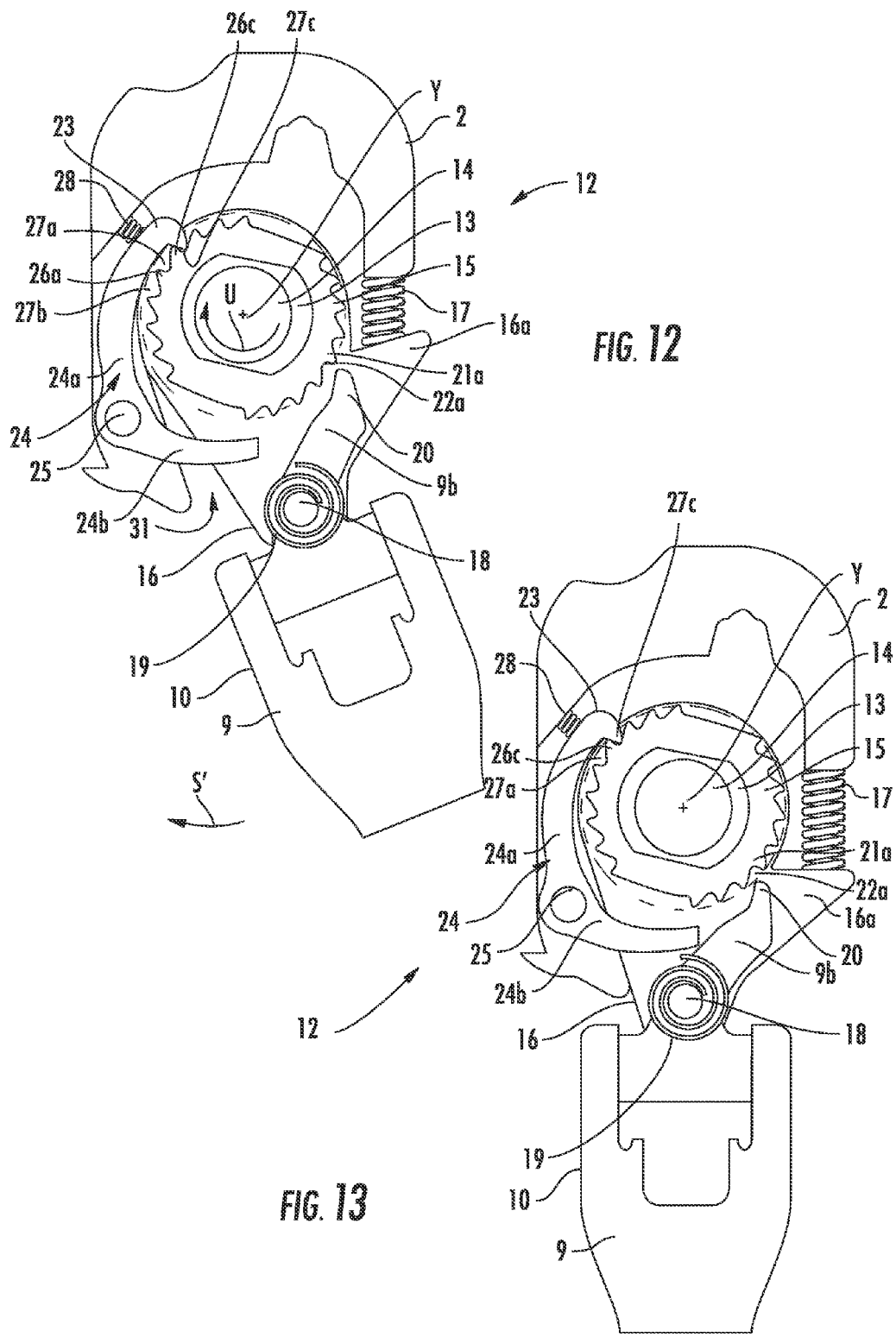

CONTROL DEVICE FOR A BICYCLE DERAILLEUR

CROSS REFERENCE TO OTHER APPLICATIONS

The present application is the U.S. national stage entry of PCT application No. PCT/IT2006/000037 filed Jan. 23, 2006, which is incorporated by reference as if fully set forth.

FIELD OF INVENTION

The present invention relates to a control device used to drive a bicycle derailleur.

BACKGROUND

A bicycle is normally provided with a rear derailleur associated with the sprocket set, which consists of a set of coaxial toothed wheels (sprockets), with different diameters and numbers of teeth, integral with the hub of the rear wheel.

A bicycle is typically also provided with a front derailleur associated with the crankset, which consists of a set of toothed wheels (toothed crowns) with different diameters and numbers of teeth, associated with a bottom bracket axle driven into rotation by a pair of pedals. In less expensive bicycles, only one toothed wheel is associated with the bottom bracket axle and there is the rear derailleur only.

A transmission chain for transmitting the pedaling motion into the motion of the rear wheel extends in a closed loop between the sprocket set and the crankset.

The rear derailleur and the front derailleur—if present—engage the transmission chain, displacing it on toothed wheels with different diameters and numbers of teeth, so as to obtain different gear ratios.

By convention, one speaks of downward gearshifting when the chain shifts from a larger diameter toothed wheel to a smaller diameter toothed wheel, of upward gearshifting when the chain shifts from a smaller diameter toothed wheel to a larger diameter toothed wheel. In this regard it should be noted that in a front gearshift group, downward gearshifting corresponds to the passage to a lower gear ratio and upward gearshifting corresponds to the passage to a higher gear ratio; vice versa in a rear gearshift group, downward gearshifting corresponds to the passage to a higher gear ratio and upward gearshifting corresponds to the passage to a lower gear ratio.

The displacement in the two directions of a derailleur is obtained through a control device mounted so as to be easily handled by the cyclist, namely normally on the handlebars, near to the handgrips where there is also the brake lever to control the brake of the front and rear wheel, respectively. Control devices that allow driving both a derailleur in the two directions and a brake are commonly known as integrated controls.

By convention, the control device of the front derailleur and the brake lever of the front wheel are located near to the left handgrip of the handlebars, and vice versa the control device of the rear derailleur and the brake lever of the rear wheel are located near to the right handgrip.

More specifically, in a mechanical gearshift, each derailleur is moved between the toothed wheels, in a first direction by a traction action exerted by a normally sheathed inextensible cable (commonly known as Bowden cable), in a second opposed direction by releasing the traction of the cable and/or by the elastic return action of a spring provided in the derailleur itself.

Normally, but not necessarily, the direction in which the displacement is caused by the release of the traction of the cable and/or by the return spring is that of downward gearshifting; vice versa, the traction action of the traction cable normally occurs in the direction of upward gearshifting, in which the chain is displaced from a smaller diameter wheel to a larger diameter wheel.

The traction cable extends along the bicycle frame up to the control device. In the control device, the traction cable is traction- or release-actuated through winding and unwinding on a rotor element, commonly known as cable-winding bush, the rotation of which is controlled by the cyclist through suitable manual actuation means.

Typically, the manual actuation means comprise a pair of levers, a pair of buttons, a button and a lever, or a bidirectional lever.

SUMMARY

The invention concerns a control device for a bicycle derailleur, comprising a support body, a cable-winding bush supported for rotation with respect to the support body, an indexer mechanism housed in the support body and suitable for controlling the angular position of the cable-winding bush, and a single manual actuation lever, the indexer mechanism comprising a toothed wheel integral in rotation with the cable-winding bush and having a first plurality of slanting teeth and a second plurality of slanting teeth, a first pawl integral with a driven arm of the lever and brought into thrusting engagement on the first teeth while the lever is manually moved in a first direction beyond a predetermined rotation threshold, and a second pawl driven out of retention engagement with the second teeth by the driven arm of the lever while the lever is manually moved in the first direction up to the predetermined rotation threshold.

BRIEF DESCRIPTION OF THE DRAWING(S)

Further features and advantages of the present invention shall become clearer from the following detailed description of some preferred embodiments thereof, made with reference to the attached drawings, merely as a non-limiting example, wherein:

FIGS. 2 to 13 show the control mechanism of the device of FIG. 1 in various steps during gearshiftings;

DETAILED DESCRIPTION OF THE PREFERRED EMBODIMENT(S)

Introduction

Figure 1:
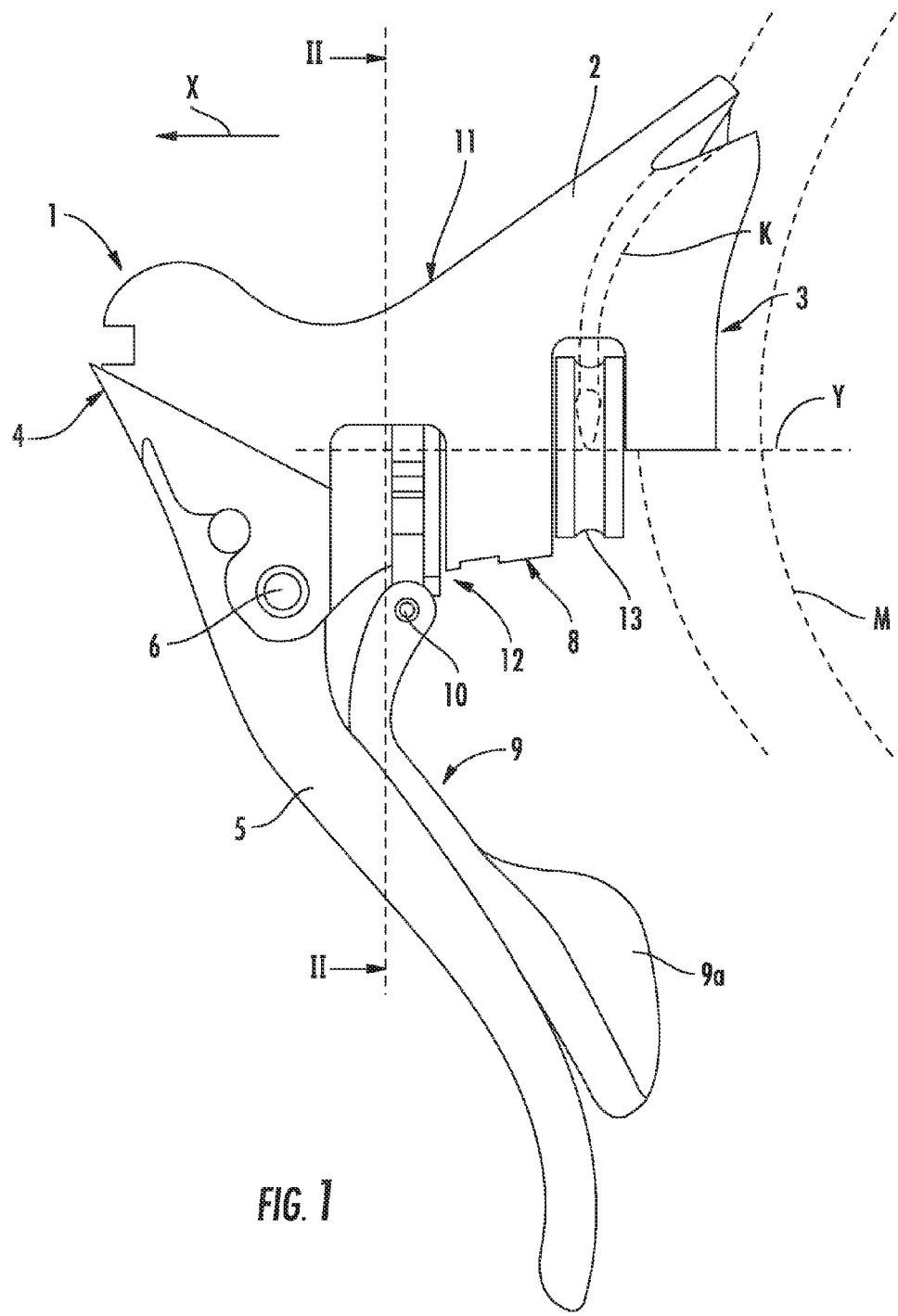
FIG. 1 shows a side view of a right integrated control device according to the invention, mounted on curved bicycle handlebars.

A control device for a bicycle derailleur comprises a support body, a cable-winding bush supported for rotation with respect to the support body, an indexer mechanism housed in the support body and suitable for controlling the angular position of the cable-winding bush, and a single manual actuation lever, the indexer mechanism comprising a toothed wheel integral in rotation with the cable-winding bush and having a first plurality of slanting teeth and a second plurality of slanting teeth, a first pawl integral with a driven arm of the lever and brought into thrusting engagement on the first teeth while the lever is manually moved in a first direction beyond a predetermined rotation threshold, and a second pawl driven out of retention engagement with the second teeth by the driven arm of the lever while the lever is manually moved in the first direction up to the predetermined rotation threshold.

While the lever of the control device is manually moved up to the predetermined rotation threshold, the first pawl comes into not interfering engagement with the first teeth, in other words it is inserted between the teeth, but the direction of rotation of the toothed wheel and the slant of the first teeth are such that the rotation of the toothed wheel is not prevented by the first pawl, and at the predetermined rotation threshold, the first pawl comes into interfering engagement with the first teeth.

Moreover, while the lever is manually moved beyond the predetermined rotation threshold, the second pawl comes into not interfering engagement with the second teeth, in other words it is inserted between the teeth, but the direction of rotation of the toothed wheel and the slant of the second teeth are such that the rotation of the toothed wheel is not prevented by the second pawl.

Furthermore, while the lever rotates in a second direction opposite the first direction, i.e. when the lever is released by the cyclist, the first pawl is out of engagement with the first teeth and the second pawl is in retention engagement with the second teeth. Therefore, the second pawl retains the new position of the toothed wheel, and thus of the cable-winding bush.

Preferably, when the lever is manually moved within the predetermined rotation threshold, the toothed wheel and the cable-winding bush rotate in the unwinding direction of a traction cable of the derailleur, fastened to the cable-winding bush. In this way, the traction force of the cable and/or of a spring associated with the derailleur automatically causes the rotation of the cable-winding bush in the unwinding direction.

More preferably, when the lever is manually moved up to the predetermined rotation threshold and then, when it is released, it rotates in a second direction opposite the first direction, the toothed wheel and the cable-winding bush carry out a rotation in the unwinding direction by an amount equal to one pitch between the second teeth, and the second pawl moves from a first gap between the second teeth to an adjacent gap between the second teeth, in this way causing a single gearshifting from a first toothed wheel of the sprocket set or of the crankset to the immediately adjacent toothed wheel, even more preferably to a toothed wheel with a smaller diameter.

Preferably, moreover, when the lever is manually moved beyond the predetermined rotation threshold, the toothed wheel and the cable-winding bush rotate in the winding direction of the traction cable fastened to the cable-winding bush. In this way, the actuation force of the cyclist is intended to overcome the traction force of the traction cable and/or of the spring associated with the derailleur.

More preferably, when the lever is manually moved beyond the predetermined rotation threshold, the toothed wheel and the cable-winding bush carry out a rotation in the winding direction by an amount equal to at least one pitch between the second teeth, and the second pawl moves from a first gap between the second teeth to an adjacent or subsequent gap between the second teeth, in this way causing a single or multiple gearshifting from a first toothed wheel of the sprocket set or of the crankset to the immediately adjacent toothed wheel, even more preferably to a toothed wheel with a greater diameter.

Advantageously, the rotation of the lever within the predetermined threshold takes place about a pivot supported by a connecting member coaxial with the toothed wheel. In this way, the motion of the driven arm of the lever and therefore of the first pawl is a pure motion towards and away from the toothed wheel, optimal for the purposes of the operation of the first pawl.

Similarly, but vice versa, the rotation of the lever beyond the predetermined threshold preferably takes place about an axis of the toothed wheel, integrally with the connecting member. In this way, the motion of the driven arm of the lever and therefore of the first pawl is purely circular, optimal for thrusting the toothed wheel into rotation.

Advantageously, the second pawl is formed on a driven arm of a swinging member pivoted onto the support body, and the driven arm of the lever, during its manual displacement up to the predetermined rotation threshold, controls a driving arm of the swinging member.

In an embodiment, the driven arm of the lever has a stepped profile for controlling the driving arm of the swinging member during the manual displacement of the lever up to the predetermined rotation threshold. With such a stepped profile, the displacement of the swinging member and thus of the second pawl is not continuous, and in particular the engagement of the second pawl between the second teeth is delayed.

In another embodiment, the driven arm of the lever has a peg or preferably a roller for controlling the driving arm of the swinging member, so as to reduce friction.

In another embodiment, the indexer mechanism further comprises a second swinging member having a first arm hinge-like coupled with the driving arm of said swinging member, and the driven arm of the lever, during its manual displacement up to the predetermined rotation threshold, controls a second arm of the second swinging member. By arranging such a second swinging member as a motion transmitting means between the lever and the swinging member on which the second pawl is formed, the second pawl can be taken further away from the driven arm of the lever without having to form it on a too long swinging member. Moreover, the degrees of freedom in the design of the arms and of the strokes of the swinging members are increased, to adapt the stroke of the second pawl to the geometry of the second teeth of the toothed wheel.

Preferably, the control device further comprises return means for biasing the lever into rotation in a second direction opposite the first direction.

Preferably the control device further comprises elastic means for biasing the second pawl into retention engagement with the second teeth.

The control device can further comprise a brake lever for controlling a brake of the bicycle, i.e. it can be an integrated device.

In case it is an integrated device, and in particular in case the integrated control device is for attachment onto curved handlebars, typical of racing bicycles, an actuation arm of the lever is preferably provided with an articulation pivot essentially parallel to a pivot of the brake lever, so as to be able to follow the braking movement.

The control device can, however, also be for attachment onto straight handlebars, typical of mountain bikes.

DESCRIPTION

The description of the control device according to the invention is made hereafter with reference to a right control device, i.e. associated with the right handgrip of the handlebars, but it is manifest that the left control device associated with the left handgrip of the handlebars will be totally analogous.

The control device 1 according to a first embodiment of the invention comprises a support body 2 to be fastened, at a rear side thereof 3, frontally of a curved handgrip portion of handlebars M through known connection means, for example through a clip, and frontally projecting from the handlebars M.

In the present description and in the attached claims, spatial terms, in particular the terms front, rear, upper, lower and vertical, are used with reference to the mounted condition of the control device, and with reference to the handlebars in a neutral position, the term inner indicating towards the center of the handlebars.

In the front region 4 of the support body 2, a brake lever 5 pivots about a pivot 6 essentially perpendicular to the advancing direction X of the bicycle. The head of a traction cable (not shown) is connected to the brake lever 5 in a known manner, for actuation of the brake when the cyclist pulls the brake lever 5 towards the handlebars M, typically with several fingers of the right hand other than the thumb.

A gearshift lever 9 projects downwards from the lower surface 8 of the support body 2, and comprises a widened actuation portion 9a suitable for receiving a finger of the right hand other than the thumb rested on it, preferably the middle finger or the ring finger. The gearshift lever 9 extends behind and along the brake lever 5 and has an articulation about a pivot 10 to follow the movement of the brake lever 5.

The support body 2 is typically covered by a protective sheath (not shown) and is shaped in such a way as to be able to be gripped by the cyclist, with the palm of the hand resting on its upper wall 11. In a different guide position, on the other hand, the cyclist grips the handlebars M below the support body 2. In both guide positions, the cyclist easily reaches both the brake lever 5 and the gearshift lever 9 with his/her fingers.

In the support body 2 an inner cavity is defined where an indexer mechanism 12 is placed. The indexer mechanism 12, described hereafter, takes up a series of predetermined angular positions about an axis Y essentially parallel to the bicycle advancing direction X. The indexer mechanism 12 rotates in a first direction as a consequence of a rotation of the gearshift lever 9 by a comparatively small angle in a first direction (out of the page with reference to FIG. 1), and rotates in the opposite direction as a consequence of a rotation of the gearshift lever 9 by a comparatively large angle in the same direction (towards the reader with reference to FIG. 1).

A cable-winding bush 13 is coupled, integral in rotation, with the indexer mechanism 12. A traction cable K, typically a sheathed cable commonly known as Bowden cable, is wound around the cable-winding bush 13 for a length dependent upon the angular position of the cable-winding bush 13. In other words, it is wound and unwound as a consequence of the actuation of the gearshift lever 9. The traction cable K extends along the bicycle frame and its opposite end is coupled with the rear derailleur—or with the front derailleur, respectively. The winding and unwinding of the traction cable K on the cable-winding bush 13 therefore cause the displacement of the derailleur and therefore the engagement of the motion transmission chain at one of the toothed wheels associated with the hub of the rear wheel—or with the bottom bracket of the bicycle respectively—corresponding to the desired gear ratio.

The indexer mechanism 12 is now described with reference to FIGS. 2 to 13, which show cross-sectional views carried out along the section plane II-II of FIG. 1, in different steps during gearshifting in a first direction (FIGS. 2 to 7) and during gearshifting in a second direction (FIGS. 2, 3 and 8 to 13).

A central pivot 14, having axis Y as its axis, is fixed to the support 2 in a per sé known way.

The cable-winding bush 13 has a hollow shaft, again indicated with reference numeral 13, pivotable about the central pivot 14. Alternatively, the rotation-free coupling of the shaft of the cable-winding bush 13 with respect to the support body 2 can take place through one or more ball bearings or bushings circumferentially outside the shaft of the cable-winding bush 13.

More specifically, the cable-winding bush 13 is integral in rotation with a toothed wheel 15. The coupling integral in rotation of the cable-winding bush 13 and of the toothed wheel 15 is carried out for example through matched non-circular sections of the shaft of the cable-winding bush 13 and of a central hole of the toothed wheel 15, as shown, but it is of course possible to provide for different couplings.

The cable-winding bush 13 and the toothed wheel 15 are biased into rotation, in the unwinding direction U of the traction cable K of the derailleur, by the traction of the cable itself and/or by the return force of a spring provided at the derailleur.

A connecting member 16 is pivoted about the central pivot 14, for example inserted onto the shaft of the cable-winding bush 13 or onto a collar of the toothed wheel 15. The connecting member 16 is forced in the unwinding direction U against the support 2 by return means, for example by the illustrated compression spring 17, extending between the support 2 and an appendix 16a of the connecting member 16. The helical compression spring 17 could be replaced by a coil spring having one end connected at a point of the connecting member 16 and the other end connected to the support body 2 or to the pivot 14, in which case the connecting member 16 would lack appendix 16a.

The gearshift lever 9, only partially visible in FIGS. 2 to 13, is pivoted to the connecting member 16 through a pivot 18. Return means, for example in the form of a coil spring 19 schematically illustrated in FIGS. 2 to 13, bias the gearshift lever 9 into a predetermined angular position with respect to the connecting member 16 and essentially vertical, shown in FIG. 2, counteracting the vibrations brought about by the travel of the bicycle.

A first pawl 20 is formed at the end of the driven arm 9b of the lever 9 to cooperate with a plurality of first slanting teeth 21 of the toothed wheel 15. More specifically, the teeth 21, seen in direction U, have an edge 91 of comparatively low slant with respect to the tangent to the toothed wheel 15, and an edge 92 of comparatively high slant with respect to the tangent to the toothed wheel 15. The first pawl 20 has a shape matching the shape of a gap 22 between two adjacent teeth 21, and therefore has an edge 20a suitable for resting and thrust on the edge 92 of comparatively high slant of the first teeth 21, therefore called "active edge" of the teeth. The first pawl 20 also has an edge 20b suitable for sliding on the edge 91 of comparatively low slant of the first teeth 21, therefore called "inactive edge" of the teeth. In the rest state of the indexer mechanism 12 shown in FIG. 2, the first pawl 20 is in a position out of engagement with the first teeth 21.

A second pawl 23 is formed at the end of a driven arm 24a of a swinging member 24 that is pivoted on the support body 2 through a pivot 25. The second pawl 23 cooperates with a second plurality of slanting teeth 26 of the toothed wheel 15. The second teeth 26, seen in direction U, also have an edge 96 of comparatively low slant with respect to the tangent to the toothed wheel 15, and an edge 97 of comparatively high slant with respect to the tangent to the toothed wheel 15. The second pawl 23 has a shape matching the shape of a gap 27 between two adjacent teeth 26, and therefore has an edge 23a suitable for acting as an abutment against the edge 97 of comparatively high slant of the second teeth 26, therefore called "active edge" of the teeth. The second pawl 23 also has an edge 23b suitable for sliding on the edge 96 of comparatively low slant of the second teeth 26, therefore called "inactive edge" of the teeth.

The teeth 21 and 26 for engagement with the two pawls 20, 23 can be different to each other, but preferably they are equal in number and geometry, so that the toothed wheel can be indiscriminately mounted in two positions angularly spaced apart by 180°.

Even if the teeth 21 and 26 are shown formed along two non-adjacent sectors of the toothed wheel 15, a completely toothed wheel could alternatively be provided.

Return means, represented by a compression spring 28 extending between the support body 2 and the free end of the driven arm 24a of the swinging member 24, force the swinging member 24 into the rest position of the indexer mechanism 12 shown in FIG. 2, wherein the second pawl 23 is engaged in one of the gaps 27 and the free end of the driving arm 24b of the swinging member 24 is in contact with the driven arm 9b of the lever 9.

In the rest state shown in FIG. 2, therefore, the cable-winding bush 13 is retained in a predetermined angular position by the engagement of the second pawl 23 in the gap indicated with 27a, an engagement that counteracts the traction force in the unwinding direction U, due to the cable K or to the spring provided at the derailleur. The gearshift lever 9 is also in rest position, essentially vertical as illustrated.

When the gearshift lever 9 is lightly pushed by the cyclist in the direction indicated with S in FIG. 3, it rotates with respect to the connecting member 16 about pivot 18. In this regard, it should be emphasized that the elastic force of the spring 19 is comparatively weak and therefore yields and compresses, when the gearshift lever 9 is pushed.

The first pawl 20 formed on the driven arm 9b of the lever 9 and therefore in rotation about pivot 18, faces one of the gaps, indicated with 22a, between the first teeth 21; the pawl 20's edge does not contact the active edge 92 of the tooth indicated with 21a.

At the same time, the driving arm 24b of the swinging member 24 is biased to slide on the driven arm 9b of the lever 9, and therefore the swinging member 24 swings in the direction indicated by the arrow 29, against the force of the compression spring 28, i.e. compressing it. The second pawl 23 therefore disengages from the gap 27a in which it was engaged.

The toothed wheel 15 and the cable-winding bush 13 are therefore free to carry out a small integral rotation in the unwinding direction U of the traction cable. The state shown in FIG. 3 is therefore a non-static state, and the indexer mechanism 12 goes essentially immediately into the state shown in FIG. 4, in which the active edge 92 of the tooth 21a came to rest upon the first pawl 20.

As a consequence of the small rotation of the toothed wheel 15 in the unwinding direction U, the second pawl 23 has passed over the ridge of the tooth 26a and now faces the subsequent gap 27b.

If the gearshift lever 9 is released in this operative state, it is returned by the coil spring 19 in the direction S' indicated in FIG. 5, opposite the direction S, and it causes the first pawl 20 to slide out from the gap 22a, as shown in FIG. 5. At the same time, the thrusting action by the driven arm 9b of the gearshift lever 9 on the driving arm 24b of the swinging member 24 also ceases. The swinging member 24 is therefore biased, by the action of the spring 28, in the direction 30 of rotation about its pivot 25 opposite the aforementioned direction 29. The second pawl 23 therefore comes into a resting relationship on the inactive edge 96 of the tooth 26a, on the side of the gap 27b. It should be noted that during this non-static step illustrated in FIG. 5, the driving arm 24b of the swinging member 24 can lose the resting relationship on the driven arm 9b of the lever or not, depending on the speed of release of the gearshift lever 9 by the cyclist.

Figure 6:
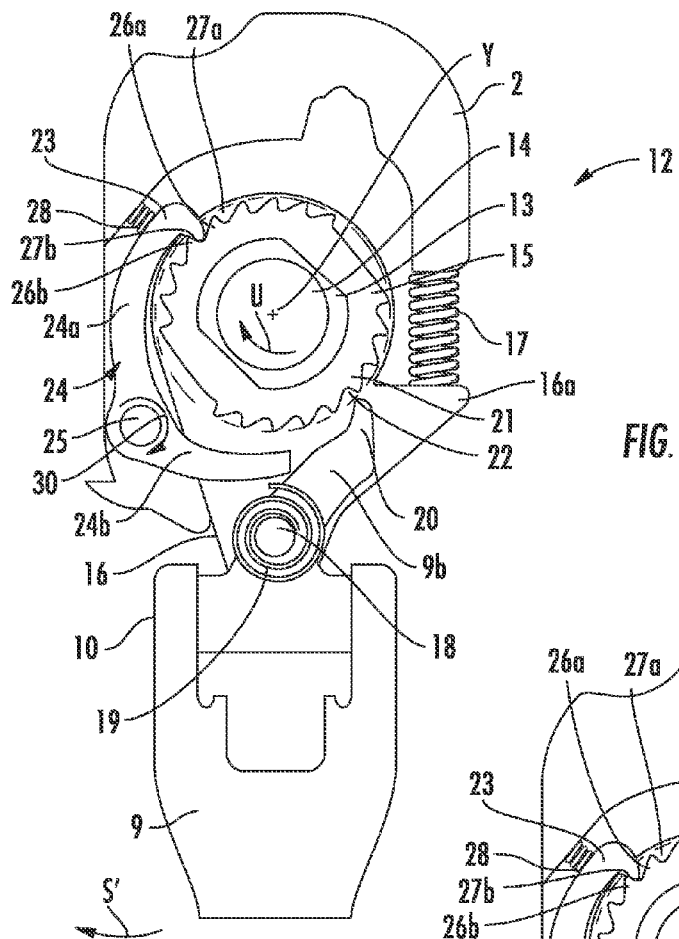

When the gearshift lever 9 goes back into the rest position, the first pawl 20 disengages from the first teeth 21, and allows the rotation of the toothed wheel 15 and of the cable-winding bush 13 integral with it to freely rotate in the unwinding direction U, as illustrated in FIG. 6, which also shows a non-static state. During such a rotation, the second pawl 23 slides along the inactive edge 96 of the tooth 26a, engaging in the gap 27b.

Figure 7:
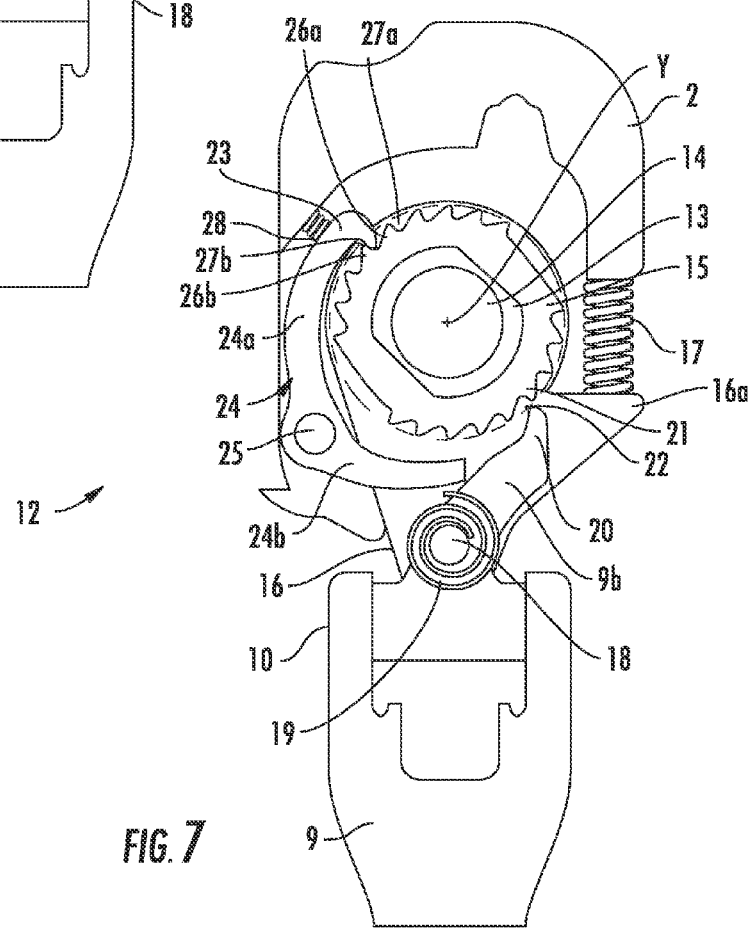

The rotation in the unwinding direction U ends when the second pawl 23 comes into a resting relationship upon the active edge 97 of the subsequent tooth 26b, as illustrated in FIG. 7. In such a state, the toothed wheel 15 and the cable-winding bush 13 are retained stationary by the engagement of the second pawl 23 in the gap 27b.

Therefore, as a consequence of the described push on the gearshift lever 9 with an angular travel of a comparatively small amount, the toothed wheel 15 and therefore the cable-winding bush 13 carry out an angular rotation in the unwinding direction U of the brake cable, of an angular amount corresponding to the pitch between the second teeth 26. Such a rotation corresponds to the release of such a length of the traction cable K as to displace the derailleur and therefore the transmission chain to the adjacent toothed wheel of the sprocket set—or of the crankset, respectively. Advantageously, such a displacement in release is in the direction of a toothed wheel with a smaller diameter, or downward gearshifting. In other types of gearshifting, however, the displacement in release can cause gearshifting towards a toothed wheel with a greater diameter, or upward gearshifting.

To carry out gearshifting in the opposite direction, the gearshift lever 9 is pushed by the cyclist in the same direction S illustrated in FIG. 3, imposing however a greater rotation. The initial operation of the control mechanism 12 is the same as that described above with reference to FIGS. 2 to 4. In other words, in the initial rotation step of the gearshift lever 9, the engagement of the first pawl 20 in the gap 22a between the first teeth 21, in resting relationship upon the active edge 92 of the tooth 21a, the disengagement of the second pawl 23 from the gap 27a between the second teeth 26, and the small rotation of the toothed wheel 15 in the unwinding direction U, take place.

With reference to FIG. 8, however, as the push of gearshift lever 9 in the direction S continues beyond the limit position shown in FIG. 3, the first pawl 20 acts by thrusting on the active edge 92 of the tooth 21a, causing the rotation of the toothed wheel 15 and therefore of the cable-winding bush in the winding direction W of the cable, opposite the unwinding direction U. More specifically, the gearshift lever 9 now rotates integrally with the connecting member 16 about the central pivot 14, against the action of the compression spring 17. In FIG. 8, indeed, it is possible to see a gap 31 between the left edge of the connecting member 16 and the support body 2.

At the same time, the thrusting action of the driven arm 9b of the gearshift lever 9 on the driving arm 24b of the swinging member 24 also ceases. The swinging member 24 is therefore biased, by the action of the spring 28, in the direction 30 of rotation about its pivot 25. The second pawl 23, which as a consequence of the rotation of the toothed wheel 15 in the winding direction W has once again passed over the ridge of tooth 26a, once again engages in the gap 27a in which it was initially engaged (see FIG. 2).

Figure 10:
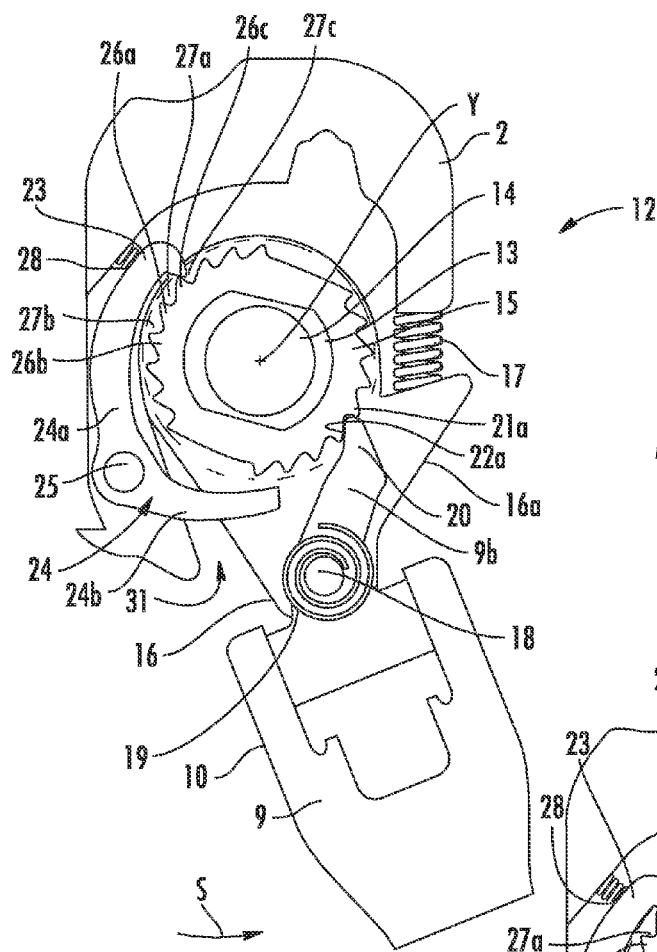
Figure 11:
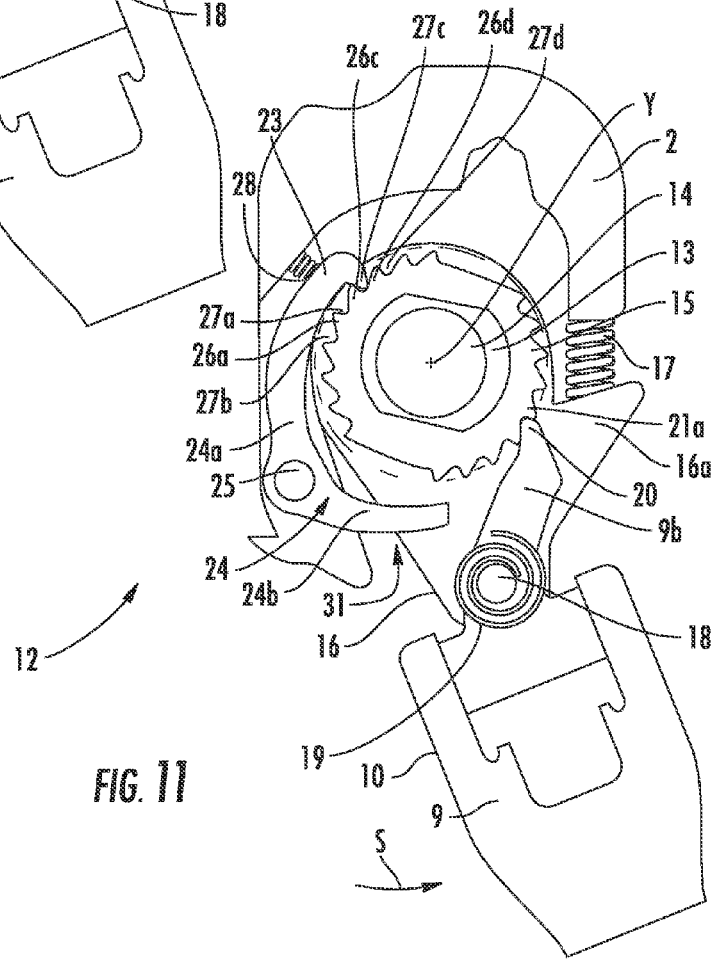

As the push in direction S on the gearshift lever 9 and the consequent rotation in the winding direction W of the toothed wheel 15 through the first pawl 20 continues, the second pawl 23 slides on the inactive edge 96 of the tooth indicated with 26c, the subsequent one in the winding direction W, as illustrated in FIG. 9; it passes over its ridge, as illustrated in FIG. 10; and it engages in the gap indicated with 27c, the subsequent one in the winding direction W, as illustrated in FIG. 11.

When the gearshift lever 9 is released, it is returned by the coil spring 19 in the direction S' indicated in FIG. 12, opposite the direction S, and it causes the disengagement of the first pawl 20 from the gap 22a, as shown in the non-static state of FIG. 12. The second pawl 23, in a resting relationship upon the active edge 97 of the tooth 26c, counteracts the tendency to rotate of the toothed wheel 15 and of the cable-winding bush 13 in the unwinding direction U, caused by the traction force of the traction cable and/or of the spring at the derailleur. The toothed wheel 15 and the cable-winding bush 13 are therefore retained stationary by the engagement of the second pawl 23 in gap 27c.

It should be noted that in the release step of the lever 9 from the position of comparatively large rotation, its motion can be a composite motion of simultaneous rotation about the pivot 14 and with respect to the connecting member 16, about the pivot 18.

The connecting member 16 and the gearshift lever 9 finally go back in to the respective rest positions, as illustrated in FIG. 13, under the action of the springs 17 and 19, respectively.

Therefore, as a consequence of the described push on the gearshift lever 9 with an angular travel of a comparatively large amount, the toothed wheel 15 and therefore the cable-winding bush 13 carry out an angular rotation in the winding direction W of the brake cable, of an angular amount corresponding to the pitch between the second teeth 26. Such a rotation corresponds to the winding of a such length of the traction cable K as to move the derailleur and therefore the transmission chain to the adjacent toothed wheel of the sprocket set—or of the crankset, respectively. Advantageously such a winding movement is in the direction of a toothed wheel with a greater diameter, or upward gearshifting. In other types of gearshift, however, the winding movement can cause gearshifting towards a toothed wheel with a smaller diameter, or downward gearshifting.

It should also be noted that by pushing the gearshift lever 9 beyond the position illustrated in FIG. 11, it is advantageously possible to carry out multiple gearshifting in the winding direction W of the cable, again through the thrust of the first pawl 20 onto the active edge 92 of the tooth 21a, since the second pawl 23 shall slide on the inactive edge 91 of the next tooth, engaging in the next subsequent gap again 27d in the winding direction W and so on.

Figure 14:
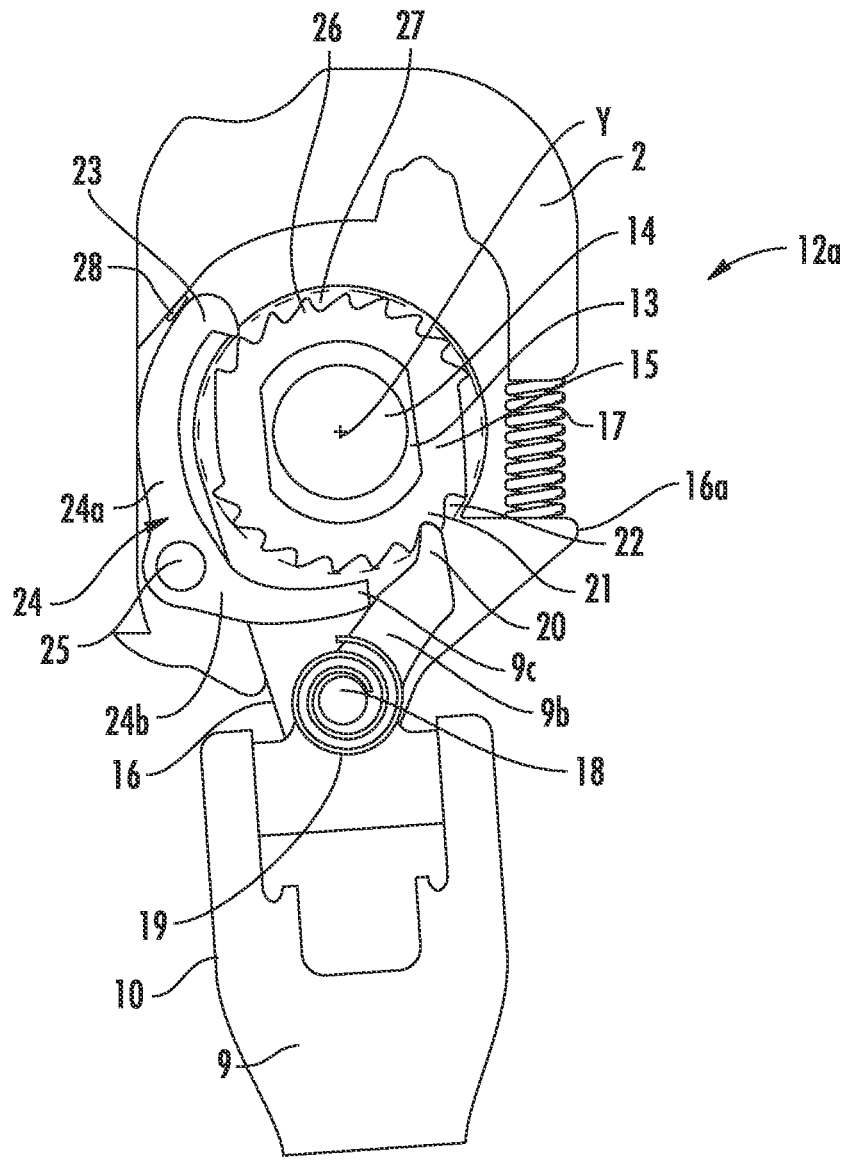
FIG. 14 shows a second embodiment of the indexer mechanism of the control device according to the invention.

FIG. 14 illustrates, in a position corresponding to that of FIG. 4, an embodiment of an indexer mechanism 12a that is modified with respect to the indexer mechanism 12 described above by the presence of a stepped profile 9c at the driven arm 9b of the gearshift lever 9, which allows a different actuation of the driving arm 24b of the swinging member 24. Indeed, while the driving arm 24b of the swinging member 24 slides on the step 9c during the pushing of the lever 9 by a comparatively large amount, the swinging member 24 does not swing about the pivot 25, rather it remains essentially still. Therefore, the engagement of the second pawl 23 in the gap 27 between the second teeth 26 is delayed with respect to the previous embodiment.

FIGS. 15 to 18 only schematically illustrate an indexer mechanism 41 according to another embodiment of the invention, in the operative states respectively corresponding to those illustrated in FIGS. 2, 3, 4 and 11. In the figures, the various springs are left out for the sake of simplicity.

In the indexer mechanism 41, the first pawl 42 is again integral with the gearshift lever 9 and the second pawl 43 is again formed on the driven arm 44a of a swinging member 44 pivoted to the support body 2 through a pivot 45. A peg 46 or preferably a roller 46 essentially parallel to pivot 45 is formed on the driven arm 9b of the gearshift lever 9. In the rest state illustrated in FIG. 15, the driving arm 44b of the swinging member 44 is in a resting relationship upon the peg or roller 46.

Figures 15, 16:
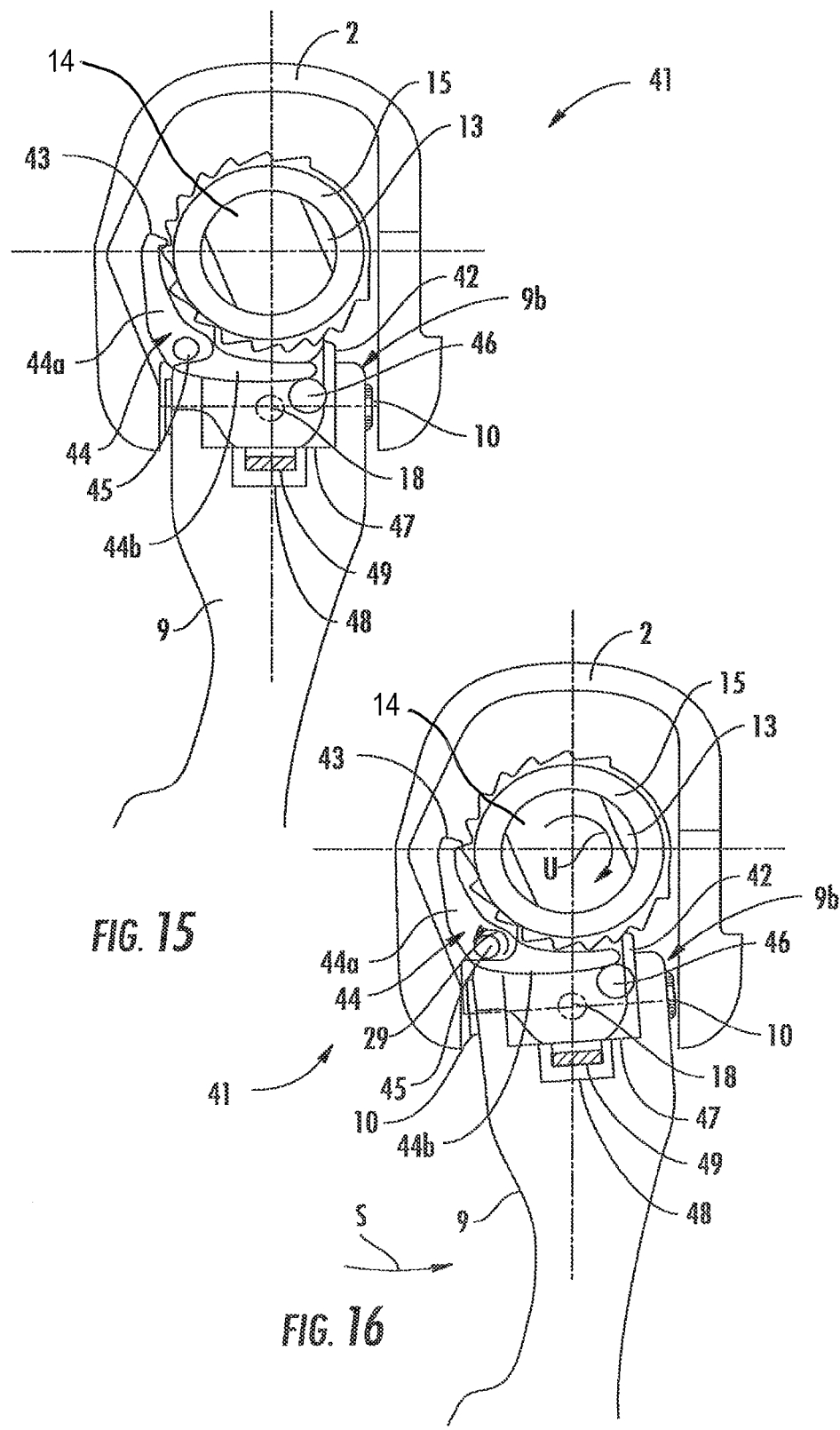
FIGS. 15 to 18 show a third embodiment of the indexer mechanism, in various steps during gearshiftings.
Figure 17:
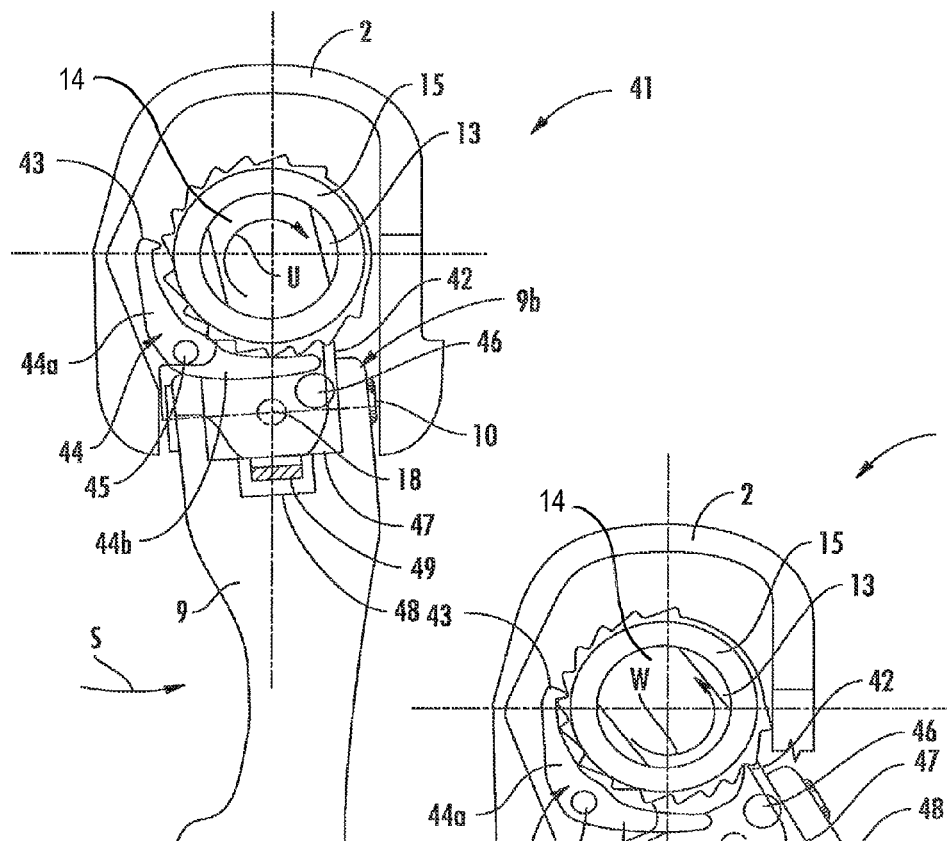

When the gearshift lever 9 is rotated in direction S by a comparatively small amount, the peg or roller 46 thrusts the driving arm 44b of the swinging member 44, and therefore the swinging member 44 rotates in the direction 29, disengaging the second pawl 43 from the toothed wheel 15, as illustrated in FIG. 16. The toothed wheel 15, and therefore the cable-winding bush 13 integral with it, are free to rotate in the unwinding direction U until the engagement of the first pawl 42 with the toothed wheel 15, as illustrated in FIG. 17.

Figure 18:
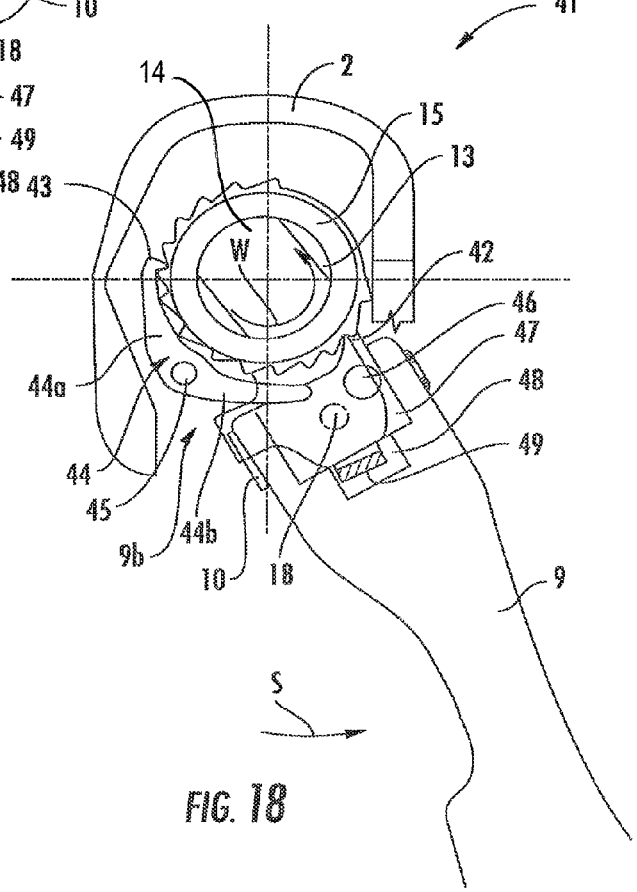

When, as illustrated in FIG. 18, the gearshift lever 9 is rotated in direction S by a comparatively large amount and the first pawl 42 thrusts the toothed wheel 15, and therefore the cable-winding bush 13 integral with it, into rotation in the winding direction W, the peg or roller 46, on the other hand, is taken out of engagement with the driving arm 44b of the swinging member 44. The lever 9 is mounted to support body 2 and rotates about both the first pivot 14 and the second pivot 18. The first pivot 14 and second pivot 18 have parallel axes.

In particular when roller 46 is provided, the friction involved is less since the contact between the swinging member 44 and the roller 46 is a rolling contact instead of a sliding contact.

It should be noted that in the embodiment illustrated in FIGS. 15-18, the two pawls 42 and 43 are formed on different planes perpendicular to the axis of rotation of the toothed wheel 15. In particular, the first pawl 42 is advantageously formed on an insert 47 articulated to the articulation pivot 10 of the lever 9 independently of the actuation portion 9a of the lever 9. In this way, when the brake lever 5 (FIG. 1) is pulled, the insert 47 does not accompany its movement and the first pawl 20 and the peg or roller 46 advantageously remain in the respective operative states. An opening of the lever 9 suitable for receiving the end of the connecting member 49 when the brake lever 5 is pulled is also illustrated with reference numeral 48.

FIGS. 19 to 22 schematically illustrate an indexer mechanism 51 according to another embodiment of the invention, again in the operative states respectively corresponding to those illustrated in FIGS. 2, 3, 4 and 11. In the figures, the various springs are left out for the sake of simplicity.

In the indexer mechanism 51, the first pawl 52 is again integral with the gearshift lever 9 and the second pawl 53 is again formed on the driven arm 54a of a swinging member 54 pivoted to the support body 2 through a pivot 55.

A second swinging member 56 is pivoted to the support body 2 through a pivot 57 in an intermediate position between the first swinging member 54 and the driven arm 9b of the gearshift lever 9. A first arm 56a of the second swinging member 56 has a concave surface that receives the driving arm 54b of the first swinging member forming a hinge-like coupling between the first swinging member 54 and the second swinging member 56.

Figures 19, 20:
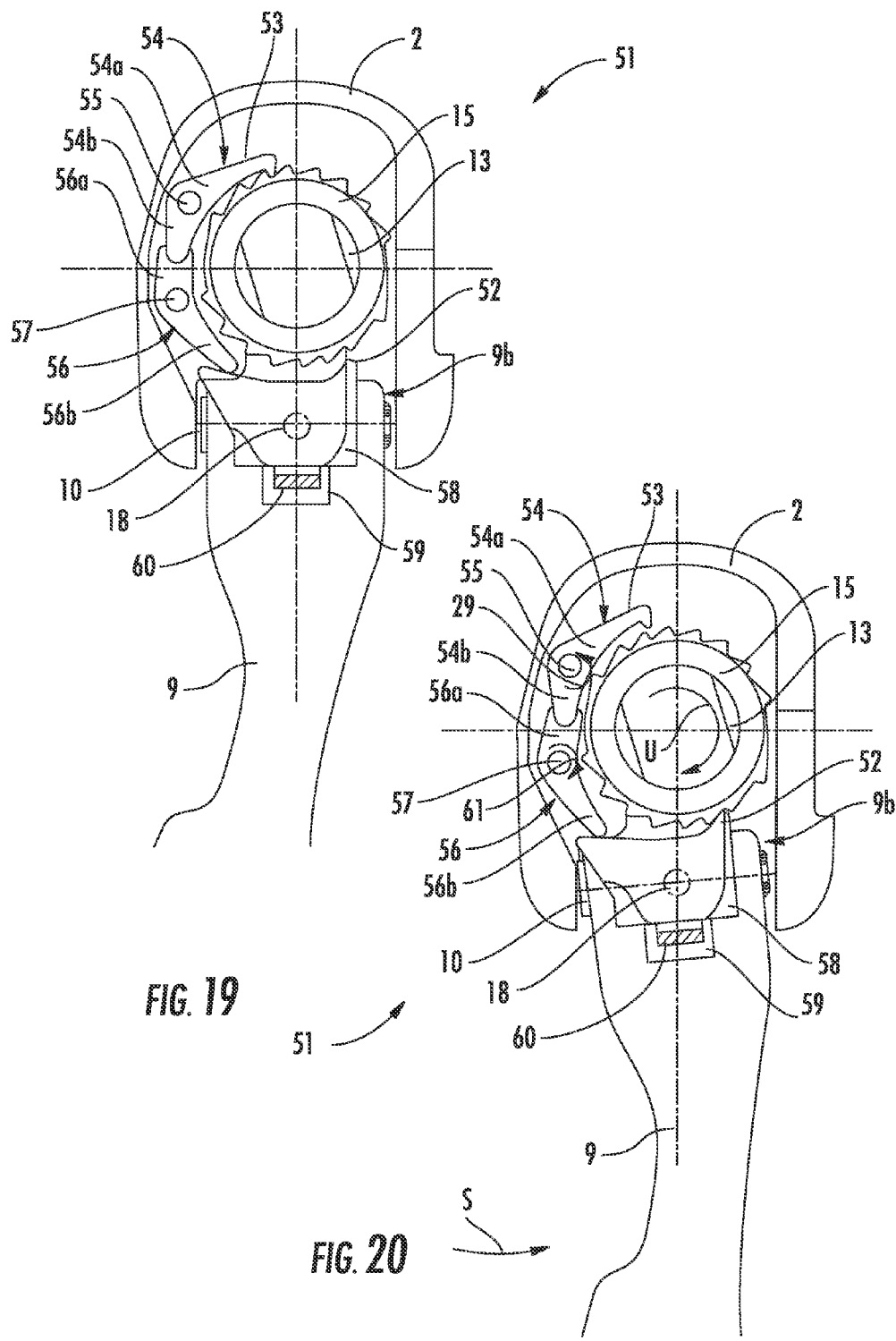
FIGS. 19 to 22 show a fourth embodiment of the indexer mechanism, in various steps during gearshiftings.

In the rest state illustrated in FIG. 19, a second arm 56b of the second swinging member 56 is in a resting relationship upon the driven arm 9b of the gearshift lever 9, and more specifically upon an insert 58 thereof on which the first pawl 52 is formed, in accordance with the embodiment of the indexer mechanism 41 described above. Also in this embodiment, the lever 9 has an opening 59 suitable for receiving the end of the connecting member 60 when the brake lever 5 is pulled.

When the gearshift lever 9 is rotated in the direction S by a comparatively small amount, the second arm 56b of the second swinging member 56 slides on the driven arm 9b of the lever 9 and in particular on the insert 58. The second swinging member 56 therefore rotates in direction 61 about the respective pivot 57. The hinge-like coupling between the first arm 56a of the second swinging member 56 and the driving arm 54b of swinging member 54 causes the rotation of the swinging member 54 in direction 29, disengaging the second pawl 53 from the toothed wheel 15, as illustrated in FIG. 20. The toothed wheel 15, and therefore the cable-winding bush 13 integral with it, are free to rotate in the unwinding direction U until engagement of the first pawl 52 with the toothed wheel 15, as illustrated in FIG. 21.

Figures 21, 22:
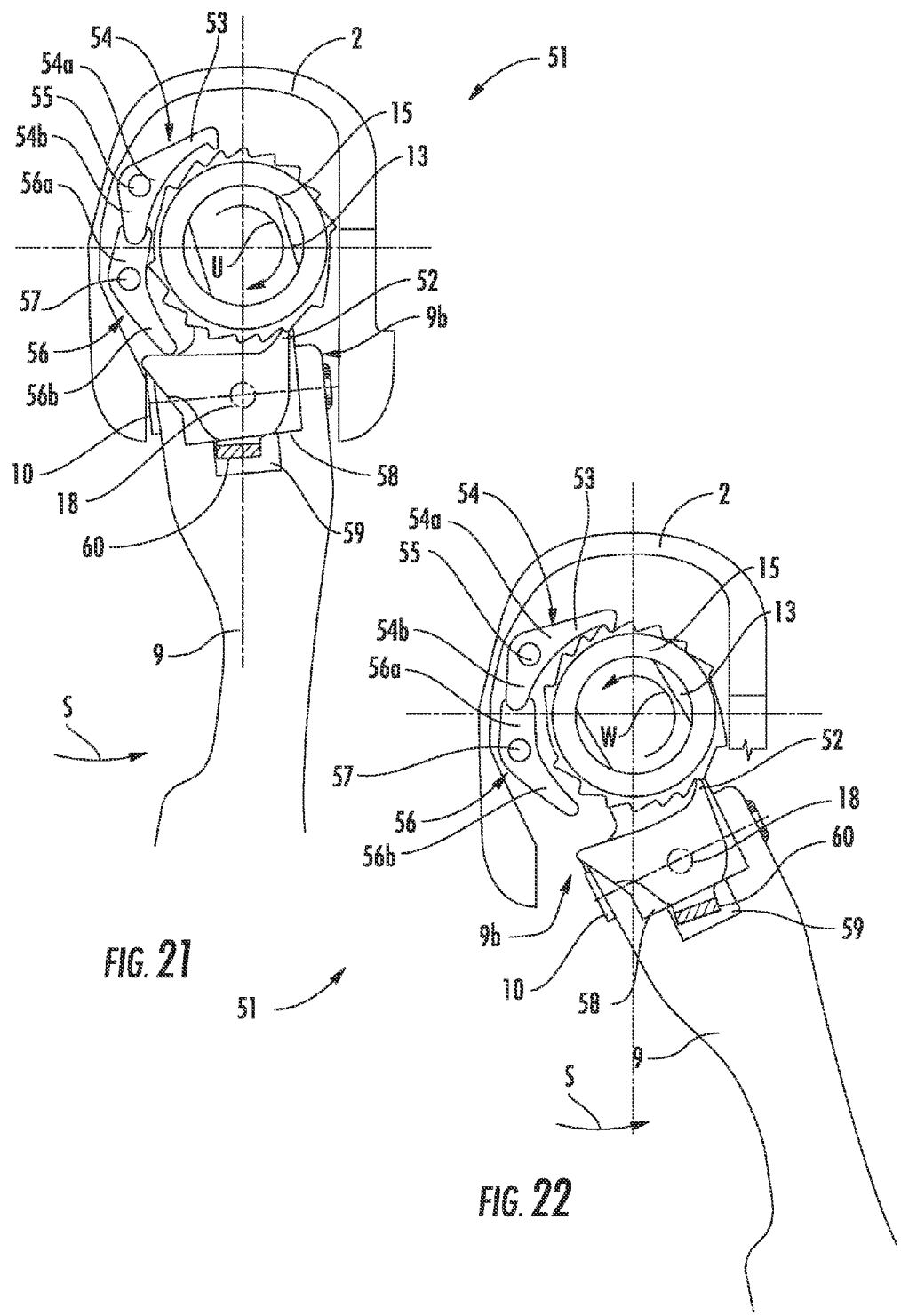

When, as illustrated in FIG. 22, the gearshift lever 9 is rotated in direction S by a comparatively large amount and the first pawl 52 thrusts the toothed wheel 15, and therefore the cable-winding bush 13 integral with it, into rotation in the winding direction W, the first arm 56a of the second swinging member 56, on the other hand, is taken out of engagement with the driven arm 9b of the gearshift lever 9.

The now described embodiment of the indexer mechanism 51 with double swinging member advantageously allows the second pawl 53 to be taken into the desired position along the toothed wheel 15, still keeping the size of the swinging member 54 on which it is formed small. Moreover, the provision of the second swinging member 56 allows the degrees of freedom in the design of the arms 54a, 54b, 56a, 56b and of the strokes of the swinging members 54, 56 to be increased, to adapt the stroke of the second pawl 53 to the height of the teeth of the toothed wheel 15.

Figure 23:
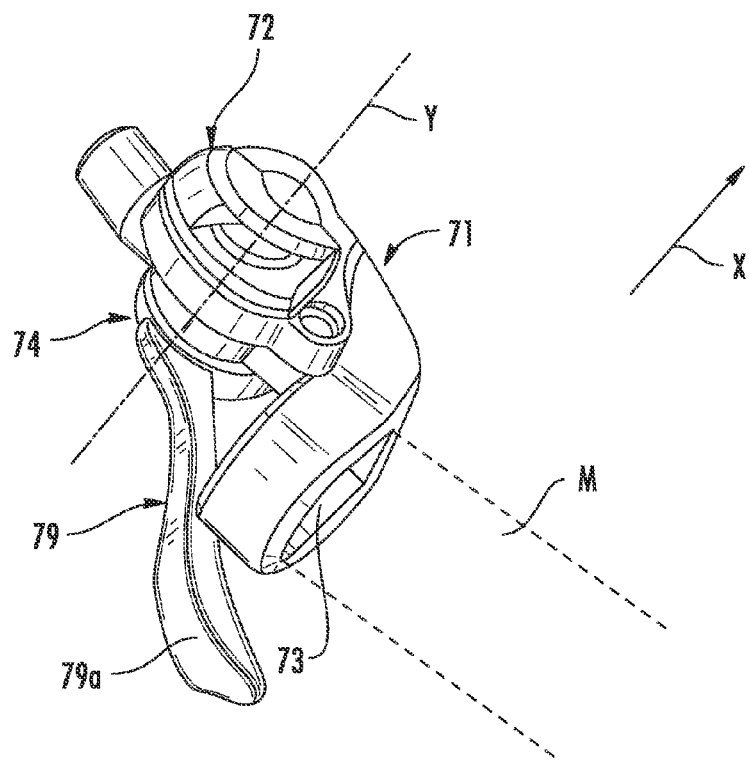
FIGS. 23 and 24 show a perspective view and a cross-sectional view of a right control device according to the invention, mounted on straight bicycle handlebars.
Figure 24:
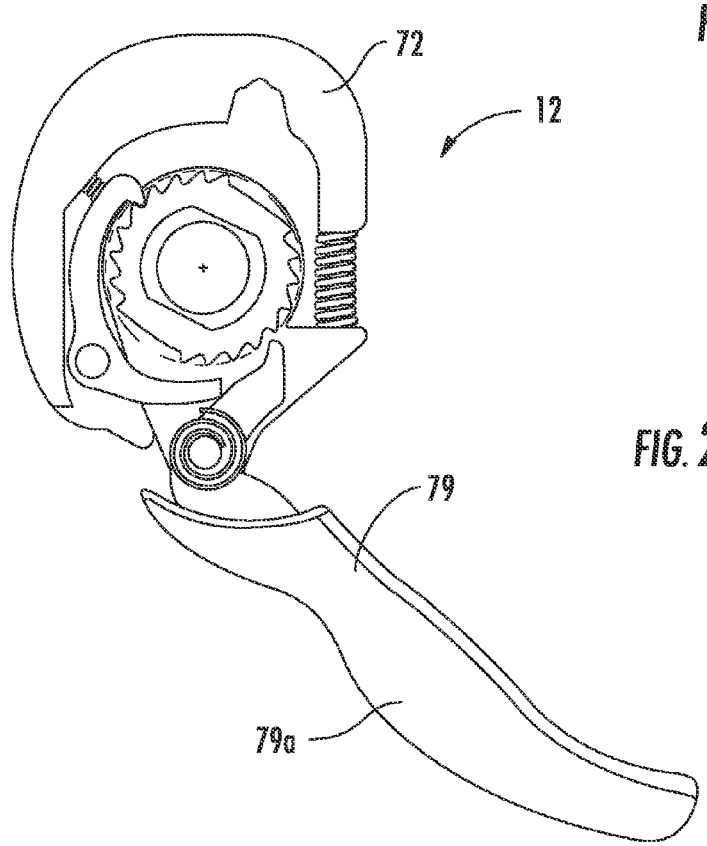

FIGS. 23 and 24 illustrate a control device 71 according to a second embodiment of the invention, mounted on straight handlebars M.

The control device 71 comprises a support body 72 having a split ring portion 73 for attachment around a straight handgrip portion of the handlebars M. The body 72 of the control device 71 frontally projects from the handlebars M.

From the rear surface 74 of the support body 72 a gearshift lever 79 projects backwards, and it comprises a widened actuation portion 79a suitable for receiving the cyclist's thumb resting on it. The gearshift lever 79 extends under the handgrip of the handlebars M, in a position that can be easily reached by the cyclist.

In the support body 72 an inner cavity is defined where an indexer mechanism 12 is placed. The indexer mechanism 12, shown in FIG. 24, is the same as the one described above in detail with reference to FIGS. 2 to 13. Alternatively, the indexer mechanism could be made in accordance with the other described embodiments.

In case the indexer mechanism is like the one of FIGS. 15 to 18 or 19 to 22, the insert 47, 58 and the opening 48, 59 on the lever shall of course be left out.

Figure 25:
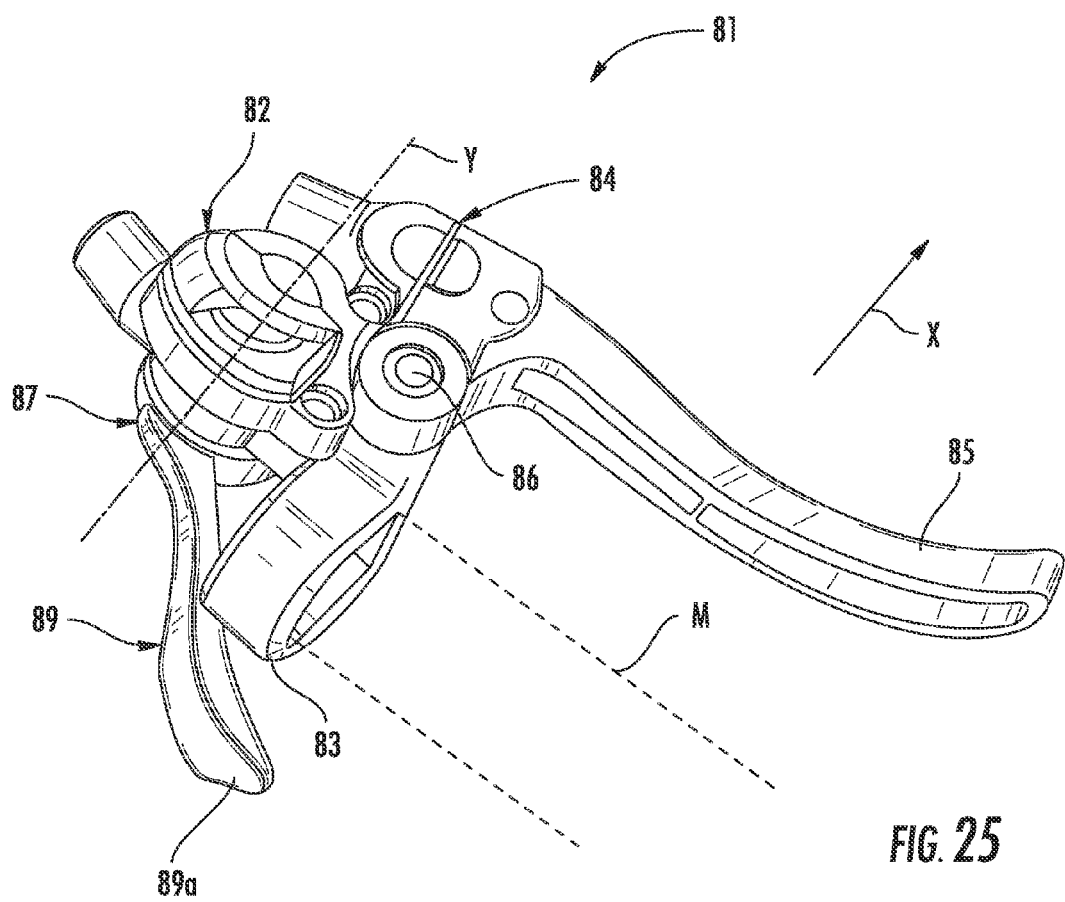
FIG. 25 shows a perspective view of a right integrated control device according to the invention, mounted on straight bicycle handlebars.

FIG. 25 illustrates a control device 81 according to a third embodiment of the invention, mounted on straight handlebars M.

The control device 81 comprises a support body 82 having a split ring portion 83 for attachment around a straight handgrip portion of the handlebars M. The body 82 of the control device 81 frontally projects from the handlebars M.

In the front region 84 of the support body 82 a brake lever 85 is pivoted, about a pivot 86 essentially perpendicular to the bicycle advancing direction X. The head of a traction cable for the actuation of the brake when the brake lever 85 is pulled by the cyclist towards the handlebars M, typically with the fingers of the right hand other than the thumb, is connected to the brake lever 85, in a known way.

From the rear surface 87 of the support body 82 a gearshift lever 89 projects backwards, and it comprises a widened actuation portion 89a suitable for receiving the cyclist's thumb resting on it. The gearshift lever 89 extends below the handgrip of the handlebars M, in a position that can be easily reached by the cyclist, and it does not have articulations since it does not have to follow the movement of the brake lever 85.

In the support body 82 an inner cavity is defined where an indexer mechanism like any of the described embodiments is placed.

What is claimed is:

1. Control device for a bicycle derailleur, comprising:
   a support body;
   a cable-winding bush supported for rotation with respect to the support body;
   an indexer mechanism housed in the support body and suitable for controlling an angular position of the cable-winding bush; and
   a single manual actuation lever mounted to the support body such that the lever rotates about first and second pivots having separate parallel axes;
   wherein the indexer mechanism comprises:
      a toothed wheel that rotates with the cable-winding bush, so that there is no relative movement between the toothed wheel and the cable-winding bush, and has a first plurality of slanting teeth and a second plurality of slanting teeth,
      a first pawl that has a connection to a driven arm of the lever and moves with the driven arm of the lever, the first pawl is capable of rotating about the axis of the first and/or the second pivot with the driven arm of the lever when the driven arm of the lever rotates about the axes of the first and second pivots, but the first pawl is not capable of rotating with respect to the driven arm of the lever about any pivot having an axis parallel to the axes of the first and second pivots and is in thrusting engagement with the first teeth while the lever is manually moved in a first direction beyond a predetermined rotation threshold, and
      a second pawl driven out of retention engagement with the second teeth by the driven arm of the lever while the lever is manually moved in the first direction up to the predetermined rotation threshold.

2. Control device according to claim 1, wherein while the lever is manually moved to the predetermined rotation threshold, the first pawl comes into not interfering engagement with the first teeth and at the predetermined rotation threshold, the first pawl comes into interfering engagement with the first teeth.

3. Control device according to claim 1, wherein while the lever is manually moved beyond the predetermined rotation threshold, the second pawl comes into not interfering engagement with the second teeth.

4. Control device according to claim 1, wherein while the lever rotates in a second direction opposite the first direction, the first pawl is disengaged from the first teeth and the second pawl is in retention engagement with the second teeth.

5. Control device according to claim 1, wherein when the lever is manually moved within the predetermined rotation threshold, the toothed wheel and the cable-winding bush rotate in an unwinding direction of a traction cable of the derailleur, fastened to the cable-winding bush.

6. Control device according to claim 5, wherein when the lever is manually moved up to the predetermined rotation threshold and then rotates in a second direction opposite the first direction, the toothed wheel and the cable-winding bush carry out a rotation in the unwinding direction of an amount equal to one pitch between the second teeth, and the second pawl moves from a first gap between the second teeth to an adjacent gap between the second teeth.

7. Control device according to claim 1, wherein when the lever is manually moved beyond the predetermined rotation threshold, the toothed wheel and the cable-winding bush rotate in a winding direction of a traction cable fastened to the cable-winding bush.

8. Control device according to claim 7, wherein when the lever is manually moved beyond the predetermined rotation threshold, the toothed wheel and the cable-winding bush carry out a rotation in the winding direction by an amount equal to at least one pitch between the second teeth, and the second pawl moves from a first gap between the second teeth to an adjacent or subsequent gap between the second teeth.

9. Control device according to claim 1, wherein the rotation of the lever within the predetermined threshold takes place about a pivot supported by a connecting member coaxial with the toothed wheel.

10. Control device according to claim 9, wherein the rotation of the lever beyond the predetermined threshold takes place about an axis of the toothed wheel, integrally with the connecting member.

11. Control device according to claim 1, wherein said second pawl is formed on a driven arm of a swinging member pivoted onto the support body, and the driven arm of the lever, during manual displacement of the driven arm of the lever up to the predetermined rotation threshold, controls a driving arm of the swinging member.

12. Control device according to claim 11, wherein the driven arm of the lever has a stepped profile for controlling the driving arm of the swinging member during the manual displacement of the lever up to the predetermined rotation threshold.

13. Control device according to claim 11, wherein the driven arm of the lever has a peg or a roller for controlling the driving arm of the swinging member.

14. Control device according to claim 11, wherein said indexer mechanism further comprises a second swinging member having a first arm rotatably coupled with the driving arm of said swinging member, and the driven arm of the lever, during manual displacement of the driven arm of the lever up to the predetermined rotation threshold, controls a second arm of the second swinging member.

15. Control device according to claim 1, further comprising return means for biasing the lever into rotation in a second direction opposite the first direction.

16. Control device according to claim 1, further comprising elastic means for biasing the second pawl into retention engagement with the second teeth.

17. Control device according to claim 1, further comprising a brake lever for controlling a brake of the bicycle.

18. Control device according to claim 17, wherein an actuation arm of the lever is provided with an articulation pivot essentially parallel to a pivot of the brake lever.

19. A control device for a bicycle derailleur, comprising:
a support body;
a cable-winding bush supported for rotation with respect to the support body;
an indexer mechanism housed in the support body and suitable for controlling an angular position of the cable-winding bush; and
a manual actuation lever;
the indexer mechanism comprising:
a swinging member having a driven arm and a driving arm, the swinging member is pivoted onto the support body about a swinging member pivot that is positioned between the driven arm and the driving arm;
a toothed wheel integral in rotation with the cable-winding bush, so that the toothed wheel and cable-winding bush function as a single unit, and having a first plurality of slanting teeth and a second plurality of slanting teeth;
a first pawl integrally formed as a portion of a driven arm of the lever and brought into thrusting engagement on the first teeth while the lever is manually moved in a first direction beyond a predetermined rotation threshold; and
a second pawl formed on the driven arm of the swinging member, wherein said second pawl disengages from the second teeth while the lever is manually moved in the first direction up to the predetermined rotation threshold, and the driven arm of the lever, during manual displacement of the driven arm of the lever up to the predetermined rotation threshold, controls the driving arm of the swinging member.

20. A control device for a bicycle derailleur, comprising:
a support body;
a cable-winding bush supported for rotation with respect to the support body;
an indexer mechanism housed in the support body and suitable for controlling an angular position of the cable-winding bush; and
a single manual actuation lever;
the indexer mechanism comprising:
a swinging member having a driven arm and a driving arm, the swinging member is pivoted onto the support body about a swinging member pivot that is positioned between the driven arm and the driving arm;
a toothed wheel that rotates with the cable-winding bush, so that there is no relative movement between the toothed wheel and the cable-winding bush, and has a first plurality of slanting teeth and a second plurality of slanting teeth;
a first pawl formed integrally with a driven arm of the lever and brought into thrusting engagement on the first teeth while the lever is manually moved in a first direction beyond a predetermined rotation threshold; and
a second pawl formed on the driven arm of the swinging member, wherein said second pawl disengages from the second teeth while the lever is manually moved in the first direction up to the predetermined rotation threshold, and the driven arm of the lever, during manual displacement of the driven arm of the lever up to the predetermined rotation threshold, controls the driving arm of the swinging member;

wherein while the lever is manually moved to the predetermined rotation threshold, the first pawl disengages from the first teeth and at the predetermined rotation threshold, the first pawl comes into interfering engagement with the first teeth;

wherein while the lever is manually moved beyond the predetermined rotation threshold, the second pawl disengages from the second teeth; and wherein while the lever rotates in a second direction opposite the first direction, the first pawl is out of engagement with the first teeth and the second pawl is in retention engagement with the second teeth.

21. A control device for a bicycle derailleur, comprising:
a support body;
a cable-winding bush supported for rotation with respect to the support body;
an indexer mechanism housed in the support body and suitable for controlling an angular position of the cable-winding bush; and
a single manual actuation lever;
the indexer mechanism comprising:
a swinging member having a driven arm and a driving arm, the swinging member is pivoted onto the support body about a swinging member pivot that is positioned between the driven arm and the driving arm;
a toothed wheel that functions with the cable-winding bush, so that there is no relative movement between the toothed wheel and the cable-winding bush, and having a first plurality of slanting teeth and a second plurality of slanting teeth;
a first pawl integral with a driven arm of the lever, so that there is no relative movement between the first pawl and the driven arm of the lever, and is in thrusting engagement with the first teeth while the lever is manually moved in a first direction beyond a predetermined rotation threshold; and
a second pawl formed on the driven arm of the swinging member, wherein said second pawl disengages from the second teeth while the lever is manually moved in the first direction up to the predetermined rotation threshold, and the driven arm of the lever, during its manual displacement up to the predetermined rotation threshold, controls the driving arm of the swinging member;
wherein while the lever is manually moved to the predetermined rotation threshold, the first pawl disengages from the first teeth, and the toothed wheel and the cable-winding bush rotate in an unwinding direction of a traction cable of the derailleur, fastened to the cable-winding bush;

when the lever is at the predetermined rotation threshold, the first pawl comes into interfering engagement with the first teeth;

wherein while the lever is manually moved beyond the predetermined rotation threshold, the second pawl disengages from the second teeth, and the toothed wheel and the cable-winding bush rotate in a winding direction of a traction cable fastened to the cable-winding bush; and wherein while the lever rotates in a second direction opposite the first direction, the first pawl is out of engagement with the first teeth and the second pawl is in retention engagement with the second teeth.

22. A control device for a bicycle derailleur, comprising:
a single manual actuation lever that is movable in a first direction to a predetermined rotation threshold to initiate one of an upwards or downwards gearshifting operation, and manually movable in the first direction beyond the predetermined rotation threshold to initiate the other one of an upwards or downwards gearshifting operation, the single manual actuation lever is mounted to the support body such that the lever rotates about first and second pivots having separate parallel axes;
wherein a first pawl has a connection to a driven arm of the lever, and the first pawl moves in a plane orthogonal to the separate parallel axes, wherein the first pawl in said plane is only capable of rotating about the axis of the first and/or second pivot with the driven arm of the lever, and the first pawl is in thrusting engagement with first teeth of the indexer mechanism's toothed wheel while the lever is manually moved beyond a predetermined rotation threshold;
wherein when the lever is manually moved up to the predetermined rotation threshold, a second pawl disengages from second teeth of an indexer mechanism's toothed wheel;
wherein the indexer mechanism's toothed wheel is biased to rotate in a first direction under tension from a cable;
wherein the movement of the lever to and beyond the predetermined rotation threshold rotates the indexer mechanism's toothed wheel and creates or relieves tension in the cable; and
wherein the creation of tension in the cable and relief of tension in the cable causes one of an upwards or downwards gearshifting operation.

* * * * *